United States Patent [19]
McKee

[11] Patent Number: 5,916,291
[45] Date of Patent: *Jun. 29, 1999

[54] METHOD AND APPARATUS FOR SHUTTLE SHIFTING A POWER TRANSMISSION

[75] Inventor: Kevin D. McKee, Naperville, Ill.

[73] Assignee: Case Corporation, Wis.

[*] Notice: This patent is subject to a terminal disclaimer.

[21] Appl. No.: 08/585,357

[22] Filed: Jan. 11, 1996

[51] Int. Cl.⁶ .................................................. B60K 41/22
[52] U.S. Cl. ................................. 701/55; 701/56; 701/61; 701/66; 192/3.58; 192/3.62; 74/336 R
[58] Field of Search ....................... 364/424.08, 424.084, 364/424.085, 424.087, 424.09, 424.093, 424.096; 74/335, 336 R, 475; 477/78, 99; 192/3.58, 3.62

[56] References Cited

U.S. PATENT DOCUMENTS

| | | | |
|---|---|---|---|
| 4,425,620 | 1/1984 | Batcheller et al. | 364/424.081 |
| 4,430,911 | 2/1984 | Morscheck | 477/124 |
| 4,855,913 | 8/1989 | Brekkestran et al. | 364/424.095 |
| 4,967,385 | 10/1990 | Brekkestran et al. | 364/571.03 |
| 4,975,845 | 12/1990 | Mehta | 364/424.088 |
| 4,989,470 | 2/1991 | Bulgrien | 74/335 |
| 4,989,471 | 2/1991 | Bulgrien | 74/336 R |
| 5,007,299 | 4/1991 | Bulgrien | 364/424.08 |
| 5,012,416 | 4/1991 | Bulgrien et al. | 364/424.096 |
| 5,012,690 | 5/1991 | Bulgrien | 74/335 |
| 5,036,718 | 8/1991 | Bulgrien | 74/335 |
| 5,043,892 | 8/1991 | Brekkestran et al. | 364/424.08 |
| 5,089,965 | 2/1992 | Braun | 364/424.081 |
| 5,353,662 | 10/1994 | Vaughters | 74/336 R |
| 5,526,261 | 6/1996 | Kallus et al. | 364/424.08 |
| 5,611,245 | 3/1997 | McKee | 192/3.63 |

FOREIGN PATENT DOCUMENTS 0 542 349  5/1993  European Pat. Off. .

*Primary Examiner*—Tan Q. Nguyen
*Attorney, Agent, or Firm*—Foley & Lardner

[57] ABSTRACT

A method and apparatus for shuttle shifting a power transmission are disclosed. The transmission is of the type including a plurality of intermeshing gears and a plurality of clutches associated with the gears. The clutches are engageable in predetermined combinations to place the transmission in various gear ratios. A control system permits the transmission to be shuttle shifted from forward to reverse gear ratios and vice versa, taking into account the vehicle speed and the target gear ratio to be engaged following the shuttle shift. If the shuttle shift request prior to expiration of a preset time following movement of a command device from a directional position, the transmission is placed in a neutral condition. If the vehicle speed is greater than a maximum allowable shuttle shifting speed upon request of the shuttle shift, the transmission is placed in a neutral condition. If the speed is not greater than the maximum allowable shuttle shifting speed, a controller compares the target gear ratio to a maximum allowable shuttle shifting gear ratio and completes the shuttle shift in different manners depending upon a predetermined relationship between the gear ratios. When a shuttle shift is aborted by the vehicle operator, a ground speed matching control routine is executed in which a gear ratio most closely matching a ratio between the engine speed and the vehicle ground speed is engaged prior to resumption of the commanded gear ratio.

23 Claims, 11 Drawing Sheets

METHOD AND APPARATUS FOR SHUTTLE SHIFTING A POWER TRANSMISSION

BACKGROUND OF THE INVENTION

The present invention relates generally to control of a power transmission in a work vehicle such as an agricultural tractor. More particularly, the invention relates to an improved technique for shuttle shifting such transmissions based, in part, on the vehicle speed and the selected gear to which a shift is to be made.

In the field of transmission systems for work vehicles, such as agricultural tractors, a number of transmission configurations and control schemes have been proposed and are presently in use. Such transmissions typically include a collection of intermeshing gears either fixed to transmission shafts or rotating freely on the shafts. Clutches associated with the freely rotating gears may be selectively engaged to establish a series of speed ratios between an engine output shaft and a transmission output shaft to transmit engine torque at a desired speed to driven wheels of the vehicle. Control systems for commanding engagement of the clutches typically include electronic circuitry that responds to operator controls, such as an upshift/downshift lever, a forward/reverse lever and the like in the vehicle cab. The control system sends electric signals to hydraulic valves that channel pressurized fluid to the clutches. The control systems thus cause the clutches to engage and disengage in predetermined combinations to accelerate, decelerate and drive the vehicle as desired by the operator. Transmissions and control systems of this type are described in U.S. Pat. No. 4,425,620, issued on Jan. 10, 1984 and assigned to Steiger Tractor, Inc., and U.S. Pat. No. 4,967,385, issued on Oct. 30, 1990 and assigned to J. I. Case Company.

Control systems of the type described above have been proposed that permit an operator to command direct shifting between forward and reverse gear ratios by movement of a gear shift lever or similar command device. In general, such systems disengage the clutches corresponding to the then current gear ratio and engage, typically through a fluid modulation scheme, clutches corresponding to the target gear ratio. A system of this type is described in U.S. Pat. No. 4,967,385 mentioned above. Variations on this general approach to shifting have been proposed that permit controlled deceleration on the vehicle during shuttle shifts by completely disengaging and stopping the transmission, then re-engaging the transmission to decelerate the vehicle in preparation for engagement of the selected gear ratio. A system generally of this type is described in U.S. Pat. No. 4,989,470, issued on Feb. 5, 1991.

While such systems have provided a degree of convenience, particularly for driving vehicles through repetitive changes in direction, they are not without drawbacks. For example, systems for controlled deceleration during shuttle shifts can be complicated to implement and include deceleration features which may be superfluous, considering that common shuttle shifting situations are usually encountered when vehicle speed is already relatively low. Moreover, known control systems for shuttle shifting power shift transmissions typically employ that same control schemes regardless of the target gears to be ultimately engaged following the shuttle shift. While this is typically acceptable where the target gear ratio provides relatively low vehicle speed in the reverse direction, directly engaging a reverse direction gear providing high vehicle speed may result in unnecessary strain or heating of the transmission elements. In addition, known shuttle shifting control systems typically do not include satisfactory schemes for re-engaging the vehicle transmission in the event of an aborted shuttle shift.

There is a need, therefore, for an improved control system for permitting and controlling shuttle shifting operation of power shift transmissions of the type found in work vehicles, such as agricultural tractors. In particular, there is a need for a control system that addressed the drawbacks of existing systems, affording convenient shifting of a transmission between forward and reverse gear ratios, taking into account the ultimate gear ratio or vehicle speed to be attained in the shift. There is also a need for a control system of this type designed to respond to overspeed shuttle shifts and aborted shuttle shifts in a convenient and intuitive manner from operator's standpoint.

SUMMARY OF THE INVENTION

The present invention features a novel control system for a work vehicle transmission designed to respond to these needs. The control system is particularly well suited to agricultural vehicles, such as farm tractors, but may be applied in a wide range of vehicles in which shuttle shifting is provided. The system permits gear ratios in both forward and reverse directions to be selected by the vehicle operator and allows for shifts between the selected gear ratios in a controlled manner simply by changing the position of a shift command lever. The system executes a control routine stored in a memory circuit to schedule and carry out the commanded shuttle shifts based, in part, upon the target gear ratio to be engaged at the end of the shift. The vehicle speed is also considered in each shuttle shift to prevent overspeed shuttle shifts. The system monitors movement of the shift command lever to detect aborted shuttle shifts and to either place the transmission in a neutral condition or to execute a ground speed matched gear ratio routine in response to such aborted shuttle shifts.

Thus, in accordance with a first aspect of the invention, a control system is provided for a power transmission in a work vehicle. The transmission is of the type including a plurality of intermeshing gears and a plurality of clutches associated with the gears, the clutches being engageable and disengageable in predetermined combinations in response to control signals for establishing predetermined forward and reverse gear ratios between and input shaft and an output shaft of the transmission. The control system includes a sensor, a memory circuit, an operator movable command device and a control circuit. The sensor detects a parameter representative of vehicle speed, while the memory circuit stores values representative of predetermined forward and reverse gear ratios and of a reference vehicle speed. The command device includes a forward position for commanding the transmission to engage a forward gear ratio and a reverse position for commanding the transmission to engage a reverse gear ratio. The control circuit is coupled to the sensor, the memory circuit and the command device, and is configured to monitor movement of the command device and to generate control signals for shifting the transmission to a neutral condition or between the predetermined forward and reverse gear ratios in response to movement of the command device between its forward and reverse positions based upon a predetermined relationship between the vehicle speed and the reference vehicle speed.

In accordance with another aspect of the invention, a transmission control system includes a memory circuit, an operator movable command device and a control circuit. The memory circuit stores values representative of predetermined forward and reverse gear ratios and of a predetermined threshold gear ratio, while the command device includes a forward position for commanding the transmission to engage the predetermined forward gear ratio and a reverse position for commanding the transmission to engage the predetermined reverse gear ratio. The control circuit is coupled to the memory circuit and to the command device and is configured to monitor movement of the command device between the forward and reverse positions. The control circuit generates control signals for shuttle shifting the transmission upon movement of the command device between the forward and reverse positions. The control circuit controls shifting of the transmission in a first manner or a second manner based upon a predetermined relationship between the predetermined gear ratio to which the transmission is to be shifted and the threshold gear ratio.

In accordance with another aspect of the invention, a transmission control system includes first and second sensors, an operator movable command device and a control circuit. The first sensor detects a first parameter representative of ground speed of the vehicle, while the second sensor detects a second parameter representative of engine output speed. The control circuit coupled to the sensors and the command device, the control circuit is configured to monitor movement of the command device between forward and reverse positions and to generate control signals for shuttle shifting the transmission between forward and reverse gear ratios in response to movement of the command device between the forward and reverse positions. The control circuit is further configured to execute a ground speed matching control routine to engage a gear ratio most closely matching a ratio between the first and second parameters when the command device is moved from the forward or the reverse position and back to the same position prior to completion of a shuttle shift.

In accordance with a further aspect of the invention, a transmission control system includes a memory circuit, an operator movable command device and a control circuit. The memory circuit stores values representative of predetermined forward and reverse gear ratios and of a predetermined threshold gear ratio. The command device includes first and second positions for commanding the transmission to engage the predetermined gear ratios. The control circuit is coupled to the memory circuit and to the command device, and is configured to monitor movement of the command device between the first and second positions. The control circuit is further configured to generate control signals for shuttle shifting the transmission upon movement of the command device between the first and second positions and for placing the transmission in a neutral condition when the command device is moved from the first position without entering the second position within a predetermined period of time.

In accordance with still another aspect of the invention, a method is provided for shuttle shifting a power transmission between predetermined forward and reverse gear ratios. The method includes the steps of comparing a target gear ratio to be engaged following a shuttle shift to a threshold gear ratio and executing the shuttle shift in a first manner when the target gear ratio and the threshold gear ratio satisfy a predetermined relationship and executing the shuttle shift in a second manner when the target gear and the threshold gear do not satisfy the predetermined relationship. In accordance with a further aspect of the invention, a method for shuttle shifting a power transmission includes the steps of monitoring movement of an operator movable shift command device from a first directional position, shuttle shifting the transmission between predetermined forward and reverse gear ratios when the command device is moved from the first directional position to a second directional position opposite to the first directional position, executing a ground speed matching control routine when the command device is moved back to the first directional position prior to completion of the shuttle shift, the ground speed matching control routine and engaging a ground speed matched gear ratio.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
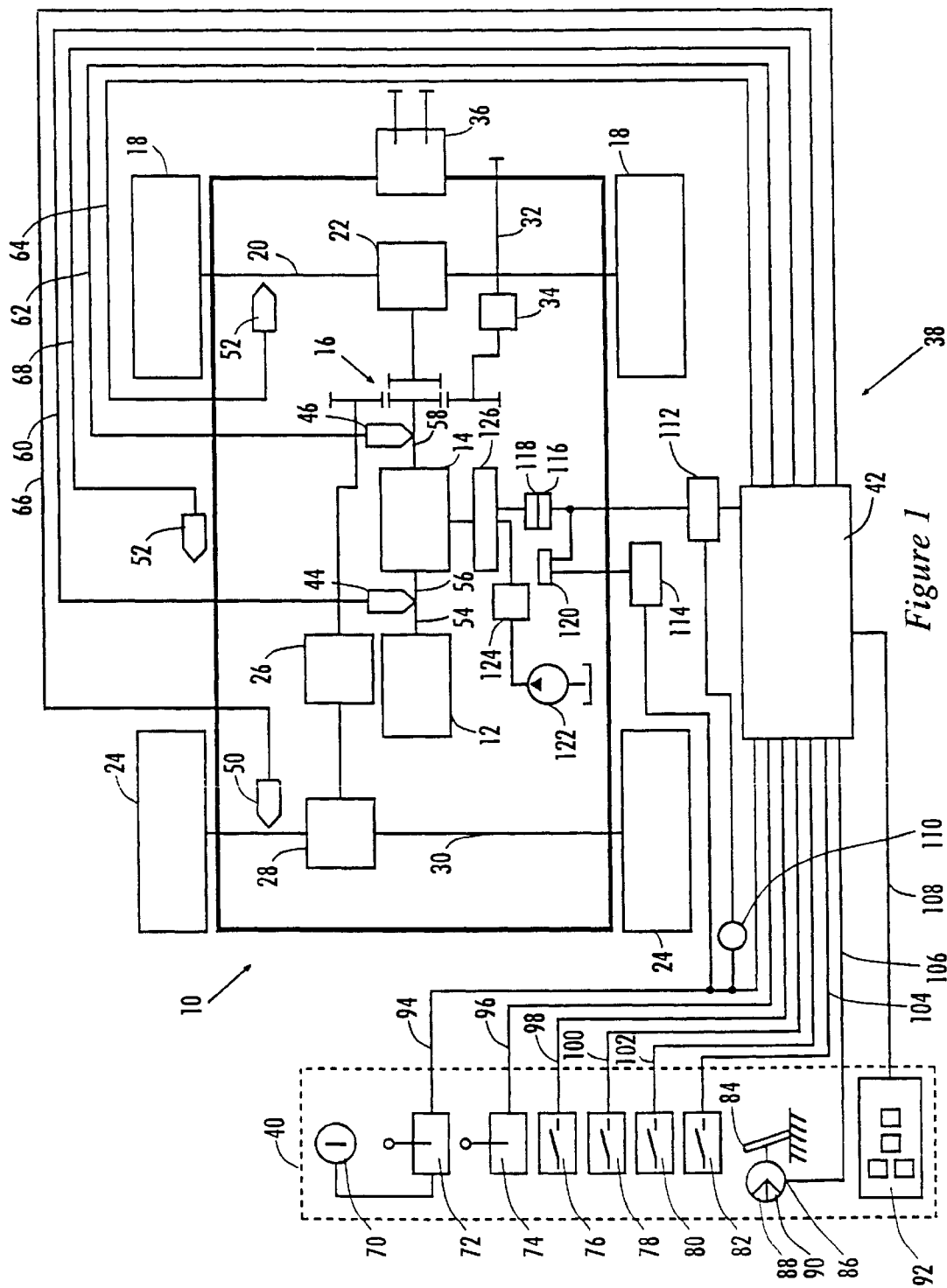
FIG. 1 is a diagrammatical view of a work vehicle incorporating an exemplary transmission control system.

Turning now to the drawings and referring to FIG. 1, a vehicle, such as an agricultural tractor, designated by the reference numeral 10, includes an engine 12 mechanically coupled to a transmission 14. Transmission 14 selectively drives gearing, designated generally the reference numeral 16, at various gear ratios as commanded by an operator and controlled by a controller as described below. Gearing 16 drives rear wheels 18 mounted on a rear axle 20 through a rear differential 22. Gearing 16 preferably also permits transmission 14 to drive front wheels 24 through a front wheel drive engagement system 26, front differential 28 and front axle 30. Gearing 16, differentials 22 and 28 and front wheel drive engagement system 26 may be of generally known construction. Gearing 16 is also coupled to a power take off shaft 32 through a power take off clutch 34 for driving various implements (not shown) which may be coupled to vehicle 10, such as on a hitch assembly 36.

The operation of transmission 14 is controlled by a control system, indicated generally by the reference numeral 38. Control system 38 includes operator command devices in an operator station 40, typically located in a covered vehicle cab (not shown). Control system 38 also includes a transmission controller 42 coupled to operator station 40 and to instrumentation and control circuitry as described below.

As schematically illustrated in FIG. 1, instrumentation for control system 38 preferably includes speed sensors 44, 46, 48, 50 and a ground speed sensor 52. Speed sensor 44 is associated with an engine output shaft 54 linking engine 12 to transmission 14, or with a transmission input shaft 56 coupled to shaft 54. Speed sensor 46 is associated with a transmission output shaft 58. Speed sensors 44 and 46 may be of any suitable type, such as a magnetic proximity sensor associated with a toothed timing gear (not shown), as are well known in the art. Sensors 44 and 46 produce electrical signals representative of the rotational speed of shafts 54 (or 56) and 58, respectively, and apply these speed signals to transmission controller 42 through data communication lines 60 and 62, respectively. Speed sensors 48 and 50, which may be substantially identical to speed sensors 44 and 46, are associated with rear axle 20 and front axle 30, respectively. Sensors 48 and 50 produce electrical signals representative of the rotational speed of axles 20 and 30, and apply these signals to transmission controller 42 via communication lines 64 and 66, respectively. Ground speed sensor 52 preferably includes a radar emitter and receiver unit of generally known construction and is secured on vehicle 10, directed generally downwardly. Ground speed sensor 52 produces an electrical signal representative of the vehicle ground speed and applies this signal to transmission controller 42 via a communication line 68.

The signals produced by sensors 44, 46, 48, 50 and 52 are used as control inputs by controller 42 as described below. It should be noted that in appropriate situations, control system 10 may include more or fewer speed sensors, such as where the signals produced by one or more of sensors 44, 46, 48, 50 and 52 are redundant, or where a signal representative of the parameter sensed by a particular sensor is available from an alternative source. For example, as described below, ground speed sensor 52 provides an indication of the ground speed of vehicle 10. However, where front axle 30 is not positively driven by engine 12, the output of speed sensor 50 may be used for this purpose, or speed sensor 50 may be eliminated from the system and only ground speed sensor 52 used for the ground speed-related signal.

In the preferred embodiment illustrated, operator station 40 includes a key switch 70, a forward-neutral-reverse-park (FNRP) selection lever 72, a gear ratio increment and decrement, or "bump" lever 74, an automatic/manual selection switch 76, a diagnostic request switch 78 and a creeper switch 80. System 38 may include switches for additional operator commanded inputs, as indicated by the reference numeral 82. The interconnections between these components and transmission controller 42 are described in greater detail below. Generally however, key switch 70 permits an operator to selectively enable and completely disable the operation of vehicle 10 and transmission 14. FNRP lever 72 may be placed in four stable positions, including "forward," "reverse," "neutral" and "park," and permits an operator to selectively command controller 42 to shift transmission 14 into various forward, reverse and neutral gear ratios for driving vehicle 10 in a desired direction of travel and at desired speeds, as well as to lock transmission 14 in a "parked" configuration discussed below. Bump lever 74 allows the operator to increment or decrement the selected gear ratio and to preselect forward and reverse gear ratios to which transmission 14 will be shifted. Selection switch 76 permits the operator to override certain automatic control functions of controller 42 described below. Creeper switch 80 allows the operator to selectively engage an extremely low range of gear ratios where corresponding creeper gearing and a creeper clutch are provided in transmission 14 as described below.

Operator station 40 also includes a clutch pedal 84 coupled to a position sensor 86, and top-of-clutch and bottom-of-clutch switches 88 and 90, respectively. Movement of clutch pedal 84, as sensed by position sensor 86 and switches 88 and 90, permits a vehicle operator to regulate certain control functions of controller 42 as described below. Position sensor 86 may be of any suitable type, such as a rotary or linear potentiometer, which generates a signal representative of the position of clutch pedal 84. Top-of-clutch switch 88 and bottom-of-clutch switch 90 are two-position switches that provide signals to controller 42 indicating when clutch pedal 84 is in its fully raised and fully depressed positions, respectively. In addition, operator station 40 includes a visual display 92 for providing an operator with information relating to the state of transmission 14 (e.g. direction and level of selected gears, diagnostic codes, and the like).

Levers 72 and 74, and switches 76, 78, 80 and 82 are linked to transmission controller 42 via communication lines 94, 96, 98, 100, 102 and 104, respectively, and apply operator-induced command signals to controller 42 through their respective communication lines. Sensor 86, and top and bottom of clutch switches 88 and 90 are similarly linked to controller 42 via one or more communication lines 106. Display 92 receives data from controller 42 via a similar communication line 108, typically in the form of a conductor bundle or instrumentation harness.

As illustrated schematically in FIG. 1, in addition to supplying command signals to controller 42, FNRP lever 72 is coupled to controller 42 through a neutral relay circuit 110 and a neutral latch circuit 112 for selectively placing and maintaining transmission 14 in a neutral condition. Moreover, FNRP lever 72 is also coupled to a limp home relay circuit 114 for selectively permitting vehicle 10 to be placed in preselected limp home gear ratios in the event of a system failure. The preferred structure and function of relay circuits 110, 112 and 114 will be described in greater detail below. Neutral latch relay circuit 112, a park switch (described below) and controller 42 are coupled to a plug connector 116 through which controller 42 provides control signals for regulating the operation of transmission 14. In normal operation, plug connector 116 is joined to a mating connector 118, whereas the latter mating connector 118 may be coupled to a limp home plug connector 120 for providing alternative circuitry paths ensuring limited transmission operation in the event of system failure as described below.

At the direction of control signals from controller 42, communicated through plug connectors 116 and 118, transmission 14 may be engaged in several distinct gear ratios via a hydraulic circuit that includes a fluid pump 122, fluid conditioning valving 124 and directional control valving 126. Pump 122 may be of any suitable type, such as a hydraulic gear pump, and will typically be coupled to engine 12 for pressurizing hydraulic for use in engaging selected clutches of transmission 14. Fluid conditioning valving 124 typically includes a pressure relief valve (not shown) for limiting system pressure, as well as appropriate pressure regulating valves as are well known in the art. Directional control valving 126 includes a bank of spring-biased, two-position, three-way valves of known construction, plumbed to receive pressurized fluid from valving 124 and to selectively direct the fluid to transmission 14. Each directional control valve in valving 126 includes a solenoid which may be energized by a control signal from controller 42 to shift the associated valve from a closed position to an open position to actuate or engage a fluid clutch within transmission 14.

Figure 2:
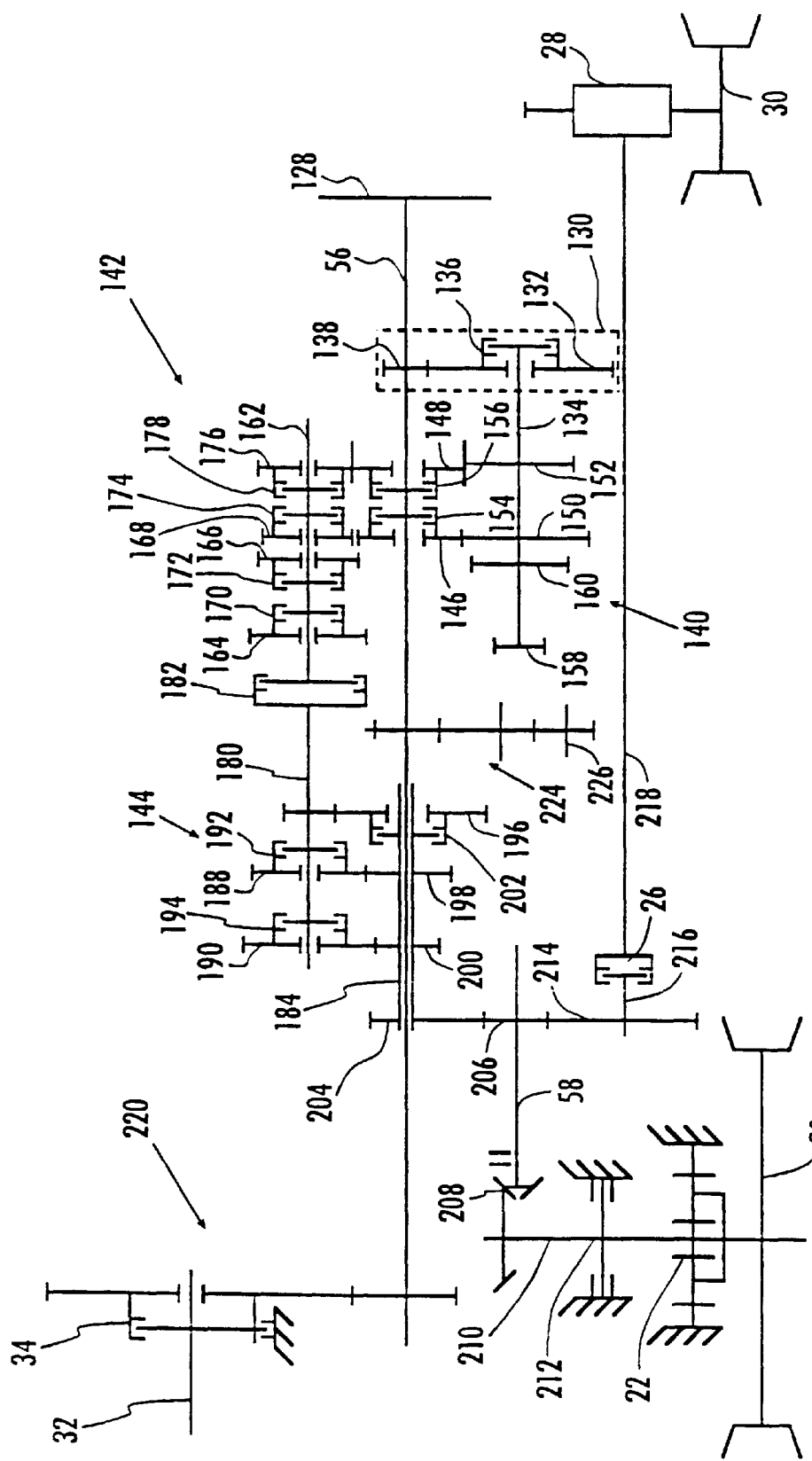
FIG. 2 is a diagrammatical view of a vehicle transmission of the type controlled by the system illustrated in FIG. 1.

Turning more particularly to the structure and operation of transmission 14, while any one of a variety of transmissions may be controlled by control system 38, FIG. 2 illustrates diagrammatically the presently preferred configuration. Transmission 14 is of a type known generally as a "power-shift transmission," wherein several sets of gears are associated with transmission shafts and certain of the gears may be selectively rotationally fixed with respect to their shafts by engagement of an associated fluid clutch to define desired gear ratios between input shaft 56 and output shaft 58. In the transmission illustrated in FIG. 2, an engine drive plate 128 is driven in rotation by the vehicle engine. Drive plate 128 is coupled to transmission input shaft 56 and powers drive shaft 56 in rotation. Gear sets, along with associated fluid clutches and transmission shafts permit a number of different gear ratio combinations to be defined for driving transmission output shaft 58 at desired speeds as follows.

A creeper gear set 130 includes a creeper gear 132 mounted on and rotational with respect to a second transmission shaft 134. A creeper clutch 136 is engageable to lock creeper gear 132 against rotation on shaft 134. Creeper gear set 130 also includes a gear 138 fixed to shaft 56 and continuously meshing with creeper gear 132. Engagement of creeper clutch 136 results in driving shaft 134 through gears 138 and 132 to obtain an extremely slow output speed of shaft 58. Creeper gear set 130 may be optionally excluded from transmission 14.

Transmission 14 includes three groups of gear sets, identified in FIG. 2 by the reference numerals 140, 142 and 144. First group 140 includes first and second gears 146 and 148 supported on and rotational with respect to shaft 56. Additional gears 150 and 152, fixed on second shaft 134 mesh continuously with gears 146 and 148, respectively. Fluid clutches 154 and 156 are associated with gears 146 and 148, respectively, and may be engaged to lock their associated gear against rotation on shaft 56. In operation, either clutch 154 or clutch 156 is engaged to obtain an input-to-output gear ratio, or both clutches may be released or disengaged to interrupt the transmission of power to shaft 134. In the preferred embodiment shown, gear combination 146 and 150 define a ratio 34:39, while gears 148 and 152 have a ratio of 37:37.

Second gear set group 142 includes gear 150, as well as to additional gears 158 and 160, all fixed on second shaft 134. Supported on a third transmission shaft 162 and rotational with respect to third shaft 162, three gears 164, 166 and 168 mesh continuously with gears 158, 160 and 152, respectively. Fluid clutches 170, 172 and 174 are associated with gears 164, 166 and 168, respectively, and may be engaged to lock the associated gear against rotation on shaft 162. Thus, either one of clutches 170, 172 or 174 may be engaged to transmit power between second shaft 134 and third shaft 162, or all of the clutches may be released to interrupt power transmission between the shafts. In the preferred embodiment illustrated, gear combination 158 and 164 provide a gear ratio of 29:44, combination 160 and 166 provide a ratio of 34:39, and combination 150 and 168 provide a ratio of 39:34.

A reverse gear set is provided adjacent to second gear set group 142 on shaft 162, and includes a reverse gear 176 mounted on and rotational about shaft 162. A reverse clutch 178 is associated with reverse gear 176 and may be engaged to lock reverse gear against rotation with respect to shaft 162, placing transmission 14 in one of several reverse gear ratios.

Third shaft 162 is aligned with and may be selectively coupled to a fourth transmission shaft 180 via a master clutch 182. Thus, when master clutch 182 is fully engaged, shaft 180 rotates at the same speed and in the same direction as shaft 162. As discussed below, master clutch 182 is preferably modulated into and out of engagement, such as by pulse-width-modulating a proportional directional control valve (not shown) included in valving 126. However, master clutch 182 may be mechanically or electro-mechanically modulated by techniques well known in the art.

Third gear set group 144 selective couples shaft 180 with a further shaft 184 disposed about shaft 56. Third gear set group 144 includes a first gear 186 fixed to shaft 180, and a pair of gears 188 and 190 supported on and rotational with respect to shaft 180. Clutches 192 and 194 are associated with gears 188 and 190, respectively, and may be engaged to lock the associated gear against rotation on shaft 180. Gears 186, 188 and 190 mesh continuously with corresponding gears 196, 198 and 200, respectively, on shaft 184. Gear 196 is supported on and rotational with respect to shaft 184, whereas gears 198 and 200 are fixed to shaft 184. A fluid clutch 202 is associated with gear 196 and may be engaged to lock gear 196 against rotation on shaft 184. Thus, by selectively engaging either clutch 192, 194 or 202, shaft 184 is caused to rotate at a predetermined speed ratio as shaft 180 is driven in rotation. In the presently preferred embodiment, gear combination 186 and 196 provide a gear ratio of 22:54, combination 188 and 198 provide a ratio of 37:39, and combination 190 and 200 provide a ratio of 52:24.

Shaft 184 transmits power to transmission output shaft 58 through gears 204 and 206, fixed on shafts 184 and 58 respectively and arranged to continuously mesh with one another. As illustrated in FIG. 2, output shaft 58 transmits power to rear axle 20 through bevel gears 208 arranged to drive a differential input shaft 210. A master brake 212 is provided on shaft 210 for braking vehicle 10. In addition to driving rear axle 20, in the preferred embodiment illustrated in FIG. 2, gear 206 carried by output shaft 58 meshes with a further gear 214 supported on a front wheel drive clutch shaft 216. A front wheel drive shaft 218 may be selectively coupled to clutch shaft 216 by front wheel drive clutch 26, and extends to front wheel drive differential 28 for driving front axle 30.

In addition to the gearing described above, transmission 14 is preferably arranged for driving power take off shaft 32 via power take off gearing 220, including power take off clutch 34. Transmission 14 also includes gearing, designated generally by the reference numeral 224, for driving a pump drive shaft 226.

All of the clutches contained in transmission 14 are preferably fluid clutches of a type well known in the art. Such clutches are typically biased in a disengaged position and engageable by the application of pressurized fluid. Moreover, while clutches 154, 156, 170, 172, 174, 178, 192, 194 and 202 may be modulated into and out of engagement, such as by gradually shifting a proportional hydraulic valve in valving 126, in the presently preferred embodiment, these clutches are engaged by hydraulic valves that are shifted directly between pressure transmitting and pressure relieving positions. However, to permit smooth transitions in shifting, master clutch 182 is preferably modulated into and out of engagement by pulse width modulating a proportional directional control valve in valving 126. Thus, direct shifting between selected gears, commonly known in the art as power shifting, may be performed by disengaging outgoing clutches (corresponding to the gear ratio being shifted from) while engaging incoming clutches (for the gear ratio being shifted to), in a coordinated and timed manner with master clutch 182 engaged. In appropriate situations where transmission 14 is to be shifted over a broad range of gear ratios, certain intermediate gear ratios may be skipped, in accordance with a technique well known in the art as "skip shifting." On the other hand, modulated shifting may be commanded by fully engaging clutches corresponding to a desired gear ratio with master clutch 182 disengaged, then modulating engagement of master clutch 182. Such modulated shifting is extremely useful in certain shifting situations, such as starting from a stop and shuttle shifting between forward and reverse gear ratios as described below.

In the presently preferred embodiment, controller 42 may command all of these types of shifting depending upon the operating conditions of transmission 14. Techniques for power shifting, skip shifting and modulated shuttle shifting are well known in the art. By way of example, such techniques are described in U.S. Pat. No. 4,967,385, issued on Oct. 30, 1990 to Brekkestran et al. and assigned to J. I. Case Company, which is hereby incorporated herein by reference. As will be appreciated by those skilled in the art, transmission 14 may execute power shifts and skip shifts both while upshifting to higher gear ratios in the same direction and while downshifting to lower gear ratios in the same direction. Similarly, transmission 14 may execute modulated shuttle shifts both from forward gear ratios to reverse gear ratios and vice versa in accordance with control logic described below with respect to FIGS. 8A, 8B and 8C.

By engaging combinations of clutches, transmission 14 establishes a number of predetermined gear ratios between input shaft 56 and output shaft 58. In particular, for the transmission illustrated in FIG. 2, the following gear ratios are provided (the prefixes F, R, C and CR representing forward, reverse, forward creeper and reverse creeper gear ratios, respectively):

| Gear ratio | Clutches engaged |
| --- | --- |
| F1 | 154, 170, 202 |
| F2 | 156, 170, 202; |
| F3 | 154, 170, 202; |
| F4 | 156, 172, 202; |
| F5 | 154, 172, 202; |
| F6 | 156, 174, 202; |
| F7 | 154, 170, 192; |
| F8 | 156, 170, 192; |
| F9 | 154, 172, 192; |
| F10 | 156, 172, 192; |
| F11 | 154, 174, 192; |
| F12 | 156, 174, 192; |
| F13 | 154, 170, 194; |
| F14 | 156, 170, 194; |
| F15 | 154, 172, 194; |
| F16 | 156, 172, 194; |
| F17 | 154, 174, 194; |
| F18 | 156, 174, 194; |
| R1 | 154, 178, 202; |
| R2 | 156, 178, 202; |
| R3 | 154, 178, 192; |
| R4 | 156, 178, 192; |
| C1 | 136, 170, 202; |
| C2 | 136, 172, 202; |
| C3 | 136, 174, 202; |
| C4 | 136, 170, 192; |
| C5 | 136, 172, 192; |
| C6 | 136, 174, 192; |
| CR1 | 136, 178, 202; |
| CR2 | 136, 178, 192. |

It should be noted that for forward gear ratios, only one clutch of each gear set group 140, 142 and 144 is engaged. Similarly, for reverse gear ratios, the reverse gear clutch 178 is engaged along with a clutch from the first and third gear set groups 140 and 144. Moreover, for creeper gear ratios, the creeper clutch 136 is engaged along with a clutch from the second gear set group 142 (or the reverse gear clutch 178) and a clutch from the third gear set group 144. As mentioned above, all gear combinations require engagement of master clutch 182 for transmission of power through transmission 14.

Figure 3:
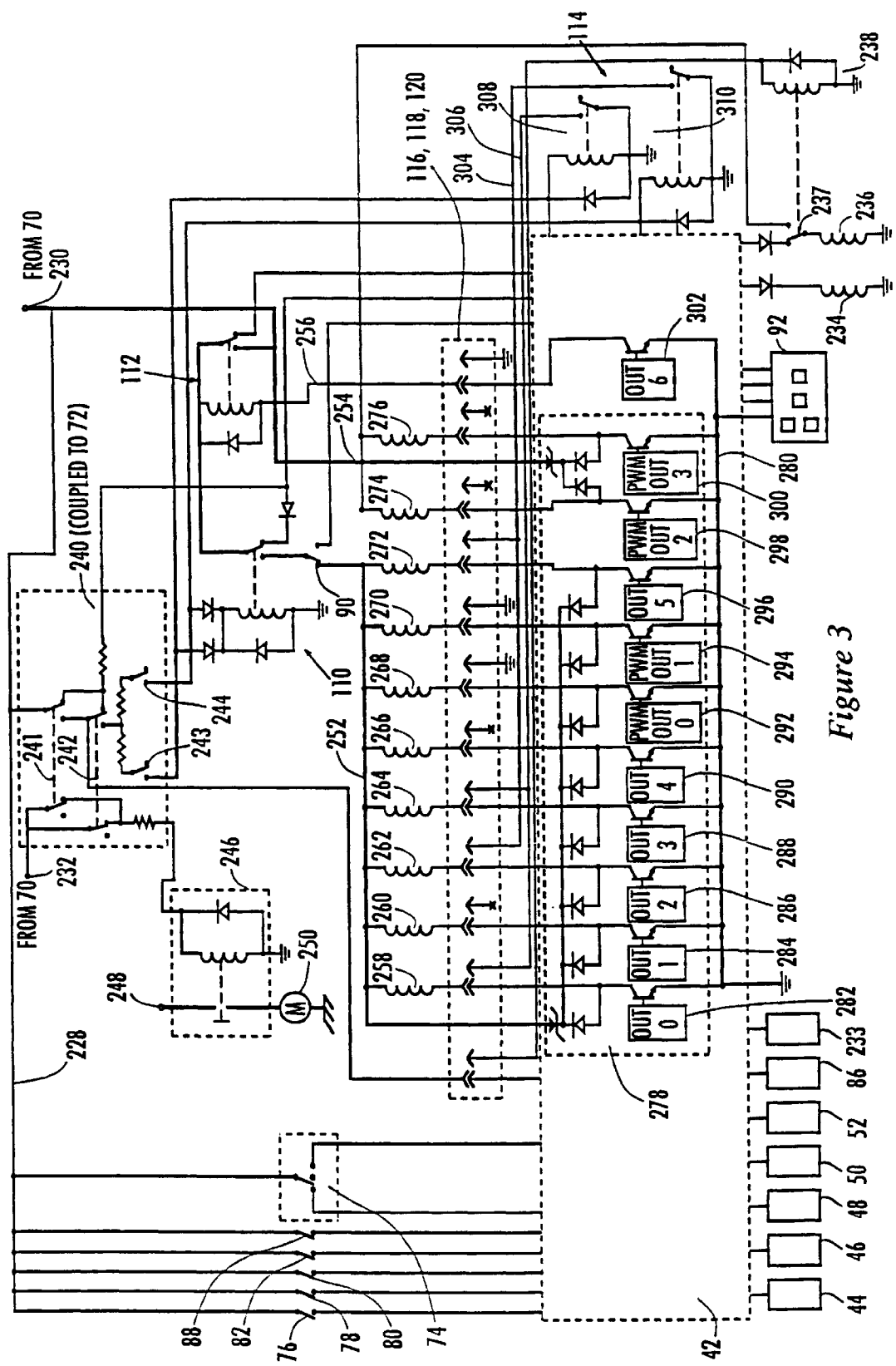
FIG. 3 is a schematic diagram of a presently preferred embodiment of the control system.
Figure 4:
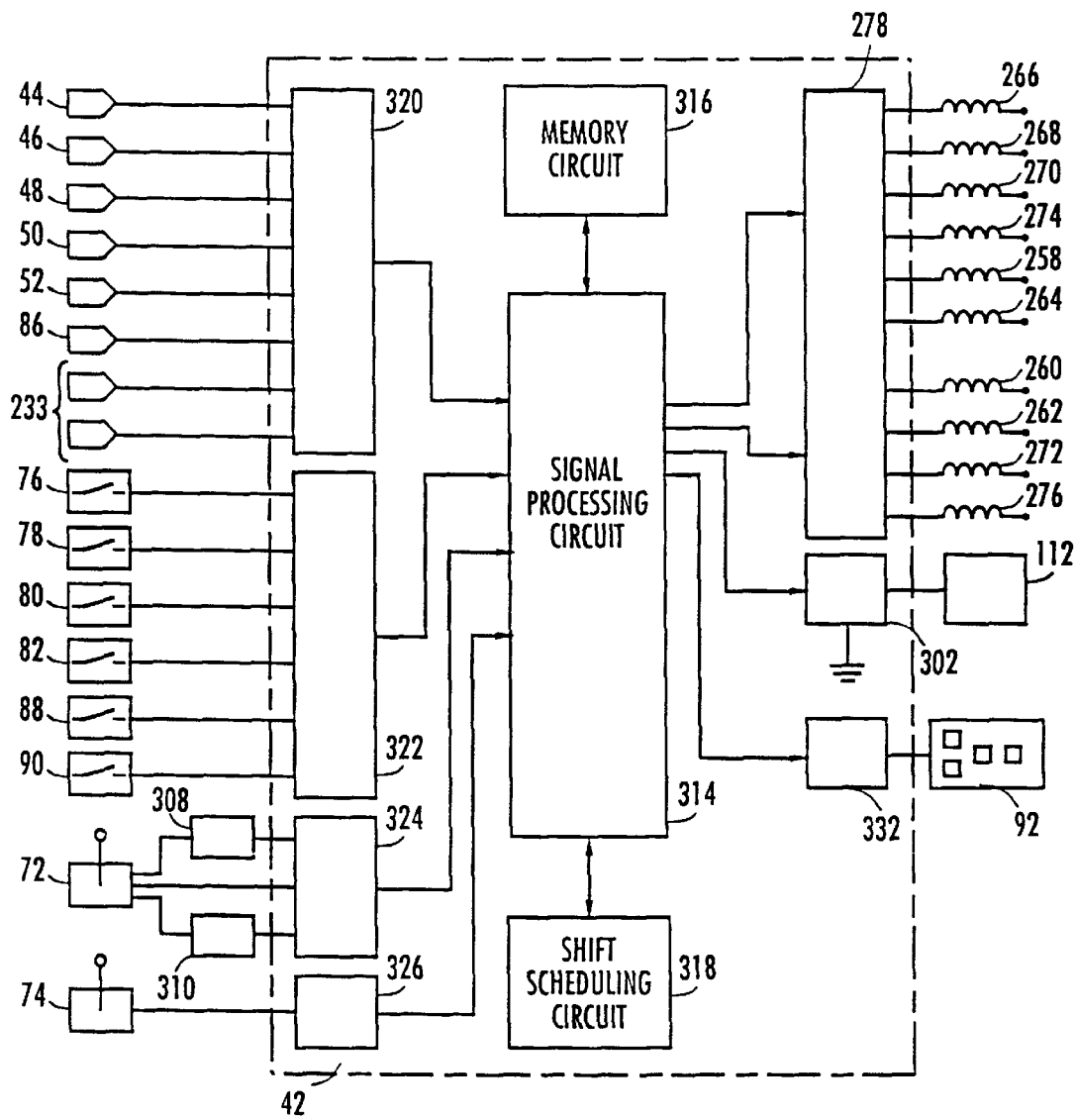
FIG. 4 is a block diagram illustrating certain functional circuitry included in the control system of FIG. 1.

In the presently preferred embodiment of control system 38, controller 42 includes a programmed digital microprocessor, memory circuitry and interface and signal conditioning circuitry for receiving input signals from the sensors and command devices discussed above and for applying control signals to directional control valving 126 coupled to transmission 14. FIG. 3 illustrates the presently preferred arrangement and interconnection between the various components of control system 38, while FIG. 4 shows the flow of certain key signals in the system between functional circuitry included in controller 42. Turning first to FIG. 3, a voltage supply line 228 is indicated as coupled to a lead 230 from key switch 70. Lead 230 couples line 228 to a source of electrical power (i.e. the electrical system of vehicle 10), when key switch 70 is placed in a "run" position. Key switch 70 is also coupled to a second lead 232 which receives electrical power when key switch 70 is placed in a "start" position. As shown in FIG. 3, auto/manual switch 76, diagnostic switch 78, creeper switch 80, additional switches 82 and top-of-clutch switch 88 are coupled between power line 228 and controller 42. Thus, when each switch is closed, a corresponding power signal is applied to an input of controller 42. Bump lever 74 is similarly coupled between power line 228 and controller 42. Bump lever 74 is biased in a center or neutral position in which it applies no signal to controller 42, and is movable to increment and decrement positions in which corresponding increment and decrement signals are applied to controller 42. Also as illustrated in FIG. 3, sensors 44, 46, 48, 50 52 and 86 are coupled to inputs of controller 42, whereas display 92 is coupled to outputs of controller 42. Controller 42 may include other inputs for additional sensors, designated generally at 223 in FIG. 3, such as transmission oil temperature sensors, pressure sensors and the like.

It should be noted that, while the various sensors and command devices discussed above are shown and described as dedicated devices included in control system 38 and coupled directly to controller 42, where vehicle 10 includes similar or redundant devices as part of other on-board control systems, controller 42 may be coupled to a data bus or similar data sharing circuit and obtain signals for control of transmission 14 as required from the data bus. Similarly, signals generated by sensors and command devices included in control system 38 may be shared by other on-board control systems via a data bus.

As shown in FIG. 3, control system 38 includes a creeper solenoid coil 234 coupled to an output of controller 42 for shifting a hydraulic directional control valve in valving 126 for directing pressurized fluid to creeper clutch 136. In addition, a park solenoid coil 236 is coupled to an additional output of controller 42 through a park contact 237 opened and closed by a limp home park relay circuit 238. Park solenoid coil 236 may be energized by controller 42 or by operation of limp home park relay circuit 238 as described below.

An FNRP circuit 240 is electrically coupled to power supply line 228 and to lead 232, and mechanically coupled to FNRP lever 72. FNRP circuit 240 includes a park switch 241, a neutral switch 242, a forward switch 243 and a reverse switch 244. Park switch 241 receives power from supply line 228, as does neutral switch 242. Park switch 241 is closed by placing lever 72 in its "park" position. Park switch 241 and neutral switch 242 are, in turn, coupled to a starter relay circuit 246 and to neutral latch circuit 112 as shown in FIG. 3 for preventing vehicle 10 from starting in a condition in which vehicle 10 may inadvertently move due to gear engagement as described below. When FNRP lever 72 is moved into its "neutral" position, neutral switch 242 is closed, while forward and reverse switches 243 and 244 are open. When FNRP lever 72 is then moved to a "forward" or "reverse" position, neutral switch 242 is opened and the corresponding forward or reverse switch 243 or 244 closed.

Starter relay circuit 246 is coupled to a power source, such as to the vehicle electrical system, through a lead 248. Lead 248 delivers an energizing signal to the vehicle starter 250, but may do so only when relay circuit 246 closes a connection between lead 248 and starter 250. Relay circuit 246 is powered only when park switch 241 or neutral switch 242 is closed (i.e. when FNRP lever 72 is in its "park" or its "neutral" position). Thus, park switch 241, neutral switch 242 and starter relay circuit 246 interrupt power to starter 250 when FNRP lever 72 is its "forward" or "reverse" positions, thereby preventing starter 250 from being energized through normal means (i.e. by turning key switch 70 to its "start" position) unless transmission 14 is placed in a neutral or parked condition (i.e. disengaged).

Neutral latch circuit 112 and neutral relay circuit 110 are arranged to provide power to drive directional control valving 126 via power supply lines 252 and 254 as follows. Neutral latch circuit 112 includes a relay coil coupled to controller 42 through a ground connection 256. In normal operation, controller 42 grounds neutral latch circuit 112 to enable its energization. As discussed below, controller 42 may interrupt this ground connection to disable or unlatch circuit 112 when desired. In FIG. 3, neutral latch circuit 112 is illustrated in its unlatched or open position, wherein neutral latch circuit 112 permits no power to flow from supply line 228 to supply line 252. However, when FNRP lever 72 is placed in a neutral position, closing neutral switch 242, power is allowed to flow through neutral latch circuit 112 to ground through controller 42, thereby energizing the coil of neutral latch 112, closing the relay. Because power then flows to the relay coil from supply line 228, the relay remains latched. Neutral latch circuit 112 thus disables transmission 14 unless and until FNRP lever 72 is placed in a neutral position and key switch 70 is moved to its "run" position. Once these two criteria are satisfied, latch 112 remains energized until key switch 70 is moved out of its "run" position or until controller 42 interrupts ground connection 256.

Neutral relay circuit 110 is coupled between neutral latch circuit 112 and supply line 252. Neutral relay circuit 110 is enabled upon energization of neutral latch relay 112, and itself is energized when either forward switch 243 or reverse switch 244 is closed by moving FNRP lever 72 to its forward or reverse position. When either switch 243 or 244 is thus closed, the coil of relay circuit 110 is energized, drawing the relay closed and providing power to supply line 252. Subsequently, when FNRP lever 72 is moved to its neutral position, opening both forward and reverse switches 243 and 244, power is interrupted to neutral relay circuit 110, causing the relay to open and interrupting power to supply line 252. Neutral relay circuit thus disables transmission 14 by interrupting power to valving 126 when FNRP lever 72 is placed in a neutral position. It should be noted that bottom-of-clutch switch 90 also is located in series between neutral relay 110 and supply line 252. When an operator depresses clutch pedal 84 fully to a bottom-of-clutch position, switch 90 shifts from the closed position illustrated in FIG. 3 to an open position, thereby interrupting power to supply line 252, placing transmission 14 in neutral and applying a bottom-of-clutch signal to controller 42.

As discussed above, each directional control valve included in valving 126 includes a solenoid coil that is energized to shift the corresponding valve, permitting pressurized fluid to flow to a clutch of transmission 14. The solenoid coils for valving 126 are illustrated schematically in FIG. 3. In the presently preferred embodiment, eight such solenoid coils, 258, 260, 262, 264, 266, 268, 270 and 272, are electrically coupled to supply line 252 for engaging clutches 154, 156, 202, 192, 194, master clutch 182, clutch 170 and reverse clutch 178, respectively. Two additional coils, 274 and 276 are coupled to supply line 254 for engaging clutches 172 and 174, respectively. Coils 258 through 276 are, in turn, coupled to solenoid driver circuits 278 in controller 42 which selectively couple the coils to a common ground line 280, thereby energizing the coil to shift an associated valve and engage a clutch. In the presently preferred embodiment, valve drivers 278 include on/off-type drivers 282, 284, 286, 288, 290 and 296, coupled to coils 258, 260, 262, 264, 266 and 272, respectively. Several pulse-width-modulated drivers 292, 294, 298 and 300, are provided for driving coils 268, 270, 274 and 276, respectively. It should be noted that in the present implementation of control circuit 38, only master clutch 182, engaged by coil 268 through pulse-width-modulated driver 294 is engaged and disengaged by modulation. Other pulse-width-modulated drivers 292, 298 and 300 either fully energize or fully de-energize their associated valve coils. However, the provision of these pulse-width-modulated drivers is preferred to permit future adaptation of controller 42 for additional clutch modulation tasks.

In addition to valve drivers 278, controller 42 includes an additional switching circuit 302 coupled to ground connection 256 from neutral latch circuit 112. Switching circuit 302 is electrically coupled to common ground line 280 and permits controller 42 to selectively unlatch neutral latch circuit 112, thereby interrupting power to supply lines 252 and 254, disabling valve coils 258 through 276 and placing transmission 14 in neutral. In normal operation, however, controller 42 maintains circuit 302 closed, thereby grounding connection 256.

It will be noted that valve coils 274 and 276 are coupled to power supply line 254, which receives electric power when key switch 70 is in a "run" position, energized even when vehicle 10 is in neutral or park. Thus, controller 42 may energize coils 274 and 276 to engage clutches 172 and 174 although the remainder of the valve solenoids are disabled. In the presently preferred embodiment, controller 42 engages clutches 172 and 174 when FNRP lever 72 is placed in its "neutral" or "park" position for more than 0.1 second, thereby locking intermediate transmission shaft 162 against rotation. Locking shaft 162 against rotation effectively defeats hydraulic drag within transmission 14 that might otherwise tend to transmit some torque through the transmission to one or more output shaft. The time delay in locking shaft 162 permits the vehicle operator to traverse the "neutral" and "park" positions quickly without engaging clutches 172 and 174. In addition, transmission 14 includes a locking pawl (not shown), spring biased into an engaged position wherein it blocks rotation of at least output shaft 58. During normal (i.e. non-parked) operation of transmission 14, the pawl is held in a non-engaged position by energizing park solenoid coil 236 via an appropriate control signal from controller 42. When FNRP lever 72 is placed in its "park"

position, however, controller 42 de-energizes coil 236, thereby releasing the pawl and preventing rotation of the transmission output shaft.

As illustrated in FIG. 3, park switch 241, valve coils 258 through 276, and ground connection 256 are coupled to controller 42 through harness connectors 116 and 118. The connections illustrated in FIG. 3 represent those present when connectors 116 and 118 are mated, as for normal operation of transmission 14. Upon the occurrence of certain system failures, such as failure of controller 42, control system 38 may be placed in a "limp home" configuration by uncoupling connector 116 from connector 118 and mating connector 118 with limp home connector 120 in a manner generally known in the art. The circuit connections present in the limp home configuration of connectors 118 and 120 are those made by shifting the upper lines entering the box shown in broken lines in FIG. 3, to the right one step. Thus, coils 260, 266, 274 and 276 make no connection in the limp home configuration, while coils 262 and 272 are coupled to a first alternative grounding line 304 and coils 258 and 264 are coupled to a second alternative grounding line 306. It should also be noted that in the limp home configuration, valve coils 268 and 270 are coupled directly to ground, resulting in engagement of clutch 170 and master clutch 182. In addition, ground line 256 from neutral latch circuit 112 is grounded in the limp home configuration, while parking switch 241 is coupled directly to limp home park relay circuit 238.

Alternative grounding lines 304 and 306 are coupled to reverse and forward limp home relay circuits 310 and 308, respectively. Forward limp home relay circuit 308 is, in turn, directly coupled to forward switch 243, while reverse limp home relay circuit 310 is directly coupled to reverse switch 244. With connectors 118 and 120 thus mated in the limp home configuration described above, forward limp home relay circuit 308 is closed by moving FNRP lever 72 to its forward position, thereby closing forward switch 243. Similarly, reverse limp home relay circuit 310 is closed by moving FNRP lever 72 to its reverse position, thereby closing reverse switch 244. Energizing forward limp home relay circuit 308 grounds line 306, thereby energizing coils 266 and 258, engaging clutches 172 and 156, and placing transmission 14 in the 8th forward gear. Energizing reverse limp home relay circuit 310 grounds line 304, thereby energizing coils 262 and 272, and placing transmission 14 in the 1st reverse gear. This limited limp home operation of transmission 14 permits an operator to transport vehicle 10 in the event of a system failure, including failure of controller 42.

It should be noted that limp home park relay circuit 238 is energized when connectors 118 and 120 are mated in the limp home configuration and FNRP lever 72 is placed in positions other than its "park" position. When energized, relay circuit 238 shift contacts 237, electrically connecting park solenoid coil 236 between power line 254 and ground, energizing coil 236 and thereby withdrawing the parking pawl from its engaged position to permit vehicle 10 to move. When FNRP lever 72 is moved to its "park" position, power is interrupted to circuit 238, releasing contact 237 to return to the position shown in FIG. 3 and de-energizing coil 236 to release the pawl.

As illustrated in FIGS. 3 and 4, signals from sensors 44, 46, 48, 50, 52, 86 and 233, and from switches 76, 78, 80, 82, 88 and 90 are applied to controller 42 via their respective communication links. Similarly, the states of FNRP lever and bump lever 74 are communicated to controller 42. In the presently preferred embodiment, controller 42 is a microprocessor-based digital controller including a signal processing circuit 314, typically configured through appropriate coding of a microprocessor, such as an Intel 80C198 microcontroller. Controller 42 further includes appropriate memory circuitry 316, which preferably includes electronically erasable programmable read only memory (EEPROM) and random access and read only memory (RAM and ROM) for storing a preset, cyclic transmission control routine implemented by signal processing circuit 314, calibration values for the various clutches and other calibrated components of control system 38, as well as various temporarily stored values used by controller 42, such as command values, sensed values and the like. A shift scheduling circuit 318, illustrated in FIG. 4 as separate from signal processing circuit 314 and memory circuit 316, but typically configured via coding within the microprocessor, functions with signal processing circuit 314 to schedule shifts into and out of gear ratios based upon the control routine executed by signal processing circuit 314.

Signal processing circuit 314 preferably includes an on-board analog-to-digital converter (not represented in FIG. 4) for converting input parameter signals directly to digital signals for processing. However, controller 42 will typically include interface circuits 320, 322, 324 and 326 for converting and conditioning the sensed and command signals produced by the system sensors and command devices into filtered signals and for isolating signal processing circuit 314 from power surges and the like. Moreover, controller 42 includes valve driver circuits 278, discussed above for converting control signals output by signal processing circuit 314 into drive signals for energizing valve coils 266 through 276. Neutral latch circuit 112 is also coupled to signal processing circuit 314, which monitors the state of circuit 112 and controls grounding of circuit 112 via driver 302. Display 92 is coupled to signal processing circuit 314 through an interface circuit 332. The particular configuration of interface circuits 320, 322, 324, 326 and 332 will vary depending upon the particular sensors, command devices and signal processing circuitry employed in the system. The construction and operation of such interface circuitry is well known to those skilled in the art.

In operation, sensors 44 through 52, 86 and 233 continuously apply their sensed parameter signals to interface circuit 320, which filters and converts these signals to a range and form usable by signal processing circuit 314. Similarly, command devices 72 through 82, 88 and 90 apply signals to signal processing circuit 314 via their respective interface circuits 324 and 326, signal processing circuit 314 typically accessing the various command signals periodically as required by the transmission control routine stored in memory circuit 316. When automatic/manual switch 76 is placed in its "manual" position, transmission 14 may be shifted upon direct command from the vehicle operator by manipulation of clutch pedal 84 and levers 72 and 74. When automatic/manual switch 76 is placed in its "automatic" position, however, signal processing circuit 314 cycles through the transmission control routine as accessed from memory circuit 316 and, based upon the input and command signals applied by the sensors and command devices, determines when and how transmission 14 is to be shifted between the gear ratios described above, as well as when portions of control system 38 should be disabled, such as by interrupting the ground to neutral latch circuit 112. As will be appreciated by those skilled in the art, memory circuit 316 stores as part of the control routine, a table of gear ratios available through particular combinations of transmission clutches as described above. Shifts selected by signal processing circuit 314 are based upon these preset combinations. The overall transmission control routine may include various subroutines for controlling transmission operation in specific situations. Generally, however, the overall control routine permits modulated shifting, including modulated shuttle shifting, skip shifting and power shifting.

Signal processing circuit 314 cooperates with shift scheduling circuit 318 to schedule the shifts (i.e. engagement and disengagement of combinations of clutches) identified by signal processing circuit 314. As mentioned above, in the presently preferred embodiment, signal processing circuit 314 and shift scheduling circuit 318 are configured in a programmed microprocessor, shift scheduling circuit 318 effectively being an aspect or subroutine of the overall control routine, adapted to schedule disengagement of "outgoing" clutches and engagement of "in-coming" clutches to obtain smooth transitions between gear ratios. Based upon this scheduling, signal processing circuit 314 generates appropriate control signals to energize and de-energize coils 266 through 276, and applies these control signals to the coils through driver circuits 278 to execute the selected shifts.

In normal operation, a vehicle operator typically configures control system 38 for automatic or manual operation by manipulating automatic/manual switch 76. The operator may then preselect forward and reverse commanded gear ratios, as described below, which are displayed on display 92. In the preferred embodiment, these gear ratios may be preselected by the vehicle operator as described in greater detail below. Both the forward and reverse preselected gear ratios are then displayed on display 92. Controller 42 will then schedule shifts to obtain the commanded gear ratio upon FNRP lever 72 being moved to either its "forward" or "reverse" position. Such shifting will typically be accomplished through the use of skip shifting, shuttle shifting and power shifting techniques as discussed above. During steady state operation of vehicle 10 in either the forward or the reverse direction, the preselected gear ratios indicated on display 92 will generally be engaged as the commanded gear ratio, unless changed by the operator. The operator may then increment or decrement the commanded gear ratio by moving bump lever 74 to its "increment" or "decrement" position. Bump lever 74 may be held in either position to increment or decrement the commanded gear ratio through more than one ratio. Bump lever 74 is released once the desired commanded gear ratio is reached. Bump lever 74 thus increments or decrements the gear ratio in the direction then currently selected via FNRP lever 72 (i.e. forward or reverse). As the forward and reverse gear ratios are incremented or decremented, these changes are indicated on gear display 92 and forward and reverse gear ratios stored in the memory circuit 316 are updated as described below. In response to such increments and decrements, controller 42 schedules and executes shifts to the desired gear ratio.

Figure 5:
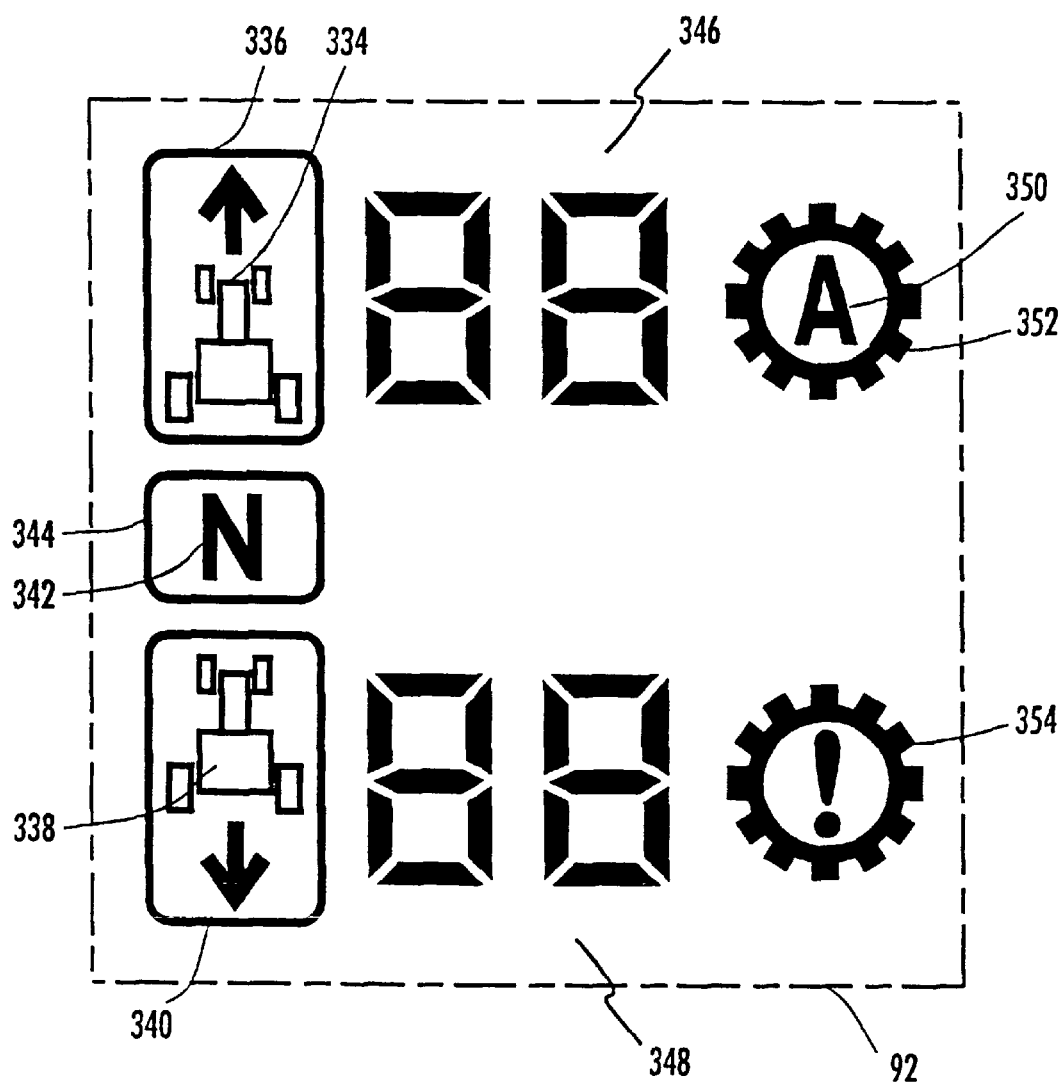
FIG. 5 illustrates a portion of a control panel display in accordance with the presently preferred embodiment, indicating information available to the vehicle operator during operation of the control system.

In addition to applying control signals to coils to engage and disengage transmission clutches, signal processing circuit outputs signals to display 92 to provide the vehicle operator with information on the operation of transmission 14 and controller 42. In the presently preferred embodiment, as illustrated in FIG. 5, display 92 includes a series of icons for conveying information to the vehicle operator. These icons include a forward icon 334, a forward box 336, a reverse icon 338 and reverse box 340, and a neutral icon 342 and neutral box 344. In addition, display 92 includes forward digits 346 and reverse digits 348, an automatic icon 350 surrounded by a transmission icon 352, and a diagnostics icon 354. In the preferred embodiment, the forward, reverse, neutral and transmission icons, 334, 338, 342 and 352, respectively, are continuously visible after vehicle 10 is powered up. When FNRP lever 72 is placed in its "forward," "reverse" or "neutral" position, thereby closing forward, reverse or neutral switches, 243, 244 or 242, respectively, the corresponding box icon 336, 338 or 344 is illuminated, indicating the then current state of transmission 14. As described above, control system 38 places transmission 14 in a neutral condition upon start up, resulting in illumination of neutral box 344 until forward or reverse gear engagement. When automatic/manual switch 76 is placed in its "automatic" position, permitting controller 42 to control engagement and disengagement of transmission 14 in accordance with the particular routine stored in memory circuit 316, automatic icon 350 is illuminated. In normal operation, forward and reverse digits 346 and 348 display preselected gear ratios in the forward and reverse direction. These preselected gear ratios are effectively the commanded forward and reverse gear ratios into which transmission 14 will be shifted by controller 42 upon movement of FNRP lever 72 to its "forward" or "reverse" positions, and may be modified by actuation of bump lever 74 as described above. However, digit displays 346 and 348 preferably permit additional information to be conveyed to the operator. For example, when FNRP lever 72 is placed in its "park" position, digit display 348 indicates the letter "P." In addition, digit displays 346 and 348 are preferably used to convey error messages for system diagnostics. When controller 42 determines that a default condition is present in system 38, diagnostic icon 354 becomes visible. Such fault conditions may include, by way of example, failure of a solenoid coil or valve driver, a difference between a detected clutch pressure and the state of a solenoid coil, open circuits and the like. Moreover, controller 42 preferably includes a diagnostics routine, of a type generally known in the art, that permits error codes indicative of such failures to be accessed from memory circuit 316. Such error codes may be conveniently displayed in two-digit code form on digit displays 346 and 348.

Figure 6:
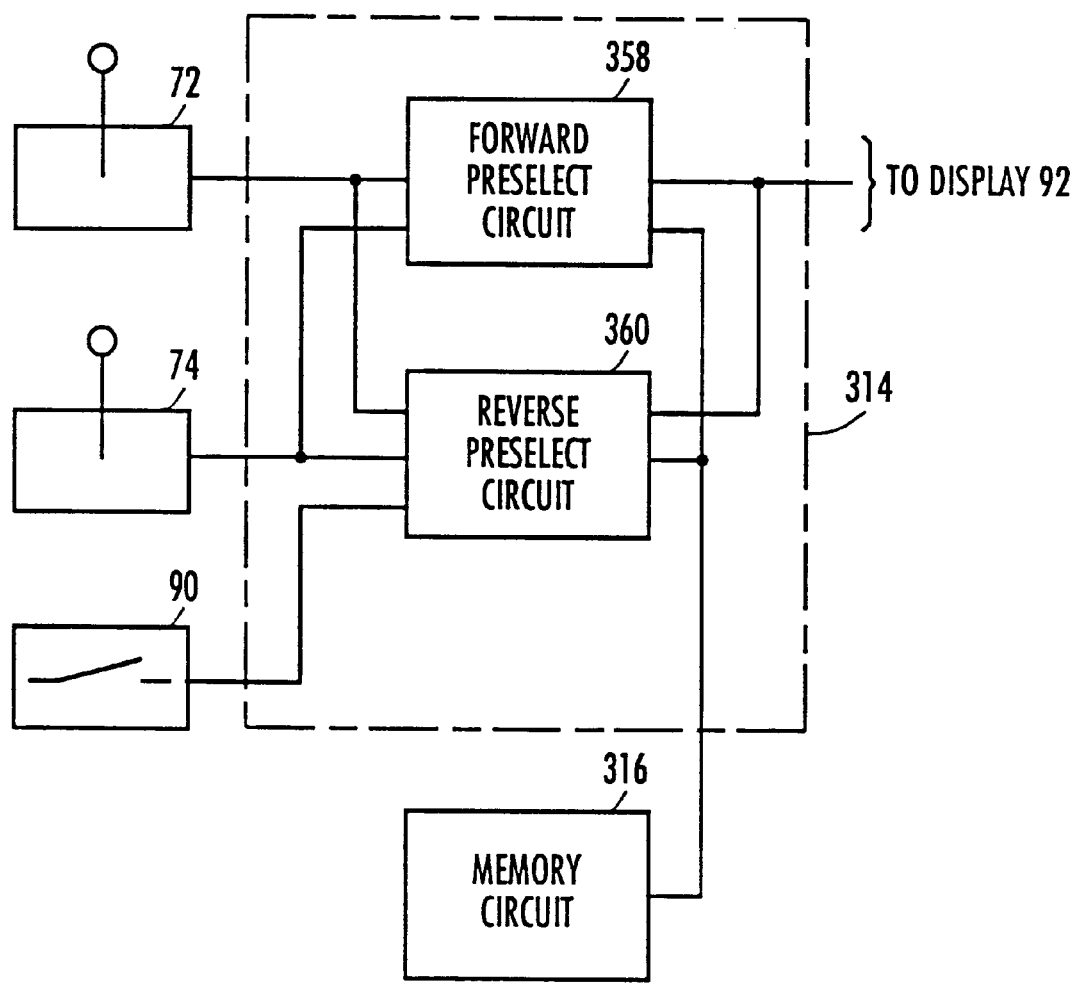
FIG. 6 is a signal flow diagram generally illustrating the flow of signals processed by the control circuit of the system shown in FIG. 4 for preselecting forward and reverse gear ratios.

FIG. 6 illustrated diagrammatically certain of the functional circuitry included in signal processing circuit 314 for permitting the vehicle operator to preselect forward and reverse gear ratios. As shown in FIG. 6, this functional circuitry includes a forward preselect circuit 358 and a reverse preselect circuit 360. As mentioned above with respect to signal processing circuit 314, forward preselect circuit 358 and reverse preselect circuit 360 are preferably configured through appropriate programming of a digital microprocessor, and will typically constitute part of a larger transmission control routine. Forward and reverse preselect circuits 358 and 360 receive inputs from FNRP lever 72 and bump lever 74. In addition, reverse preselect circuit 360 receives as an input the state of bottom-of-clutch switch 90. Both circuits 358 and 360 are coupled to memory circuit 316 for accessing the current preselected gear ratio values and storing reset values as described below. Moreover, both circuits 358 and 360 are coupled to display circuit 92 for displaying indicia (e.g. digital arrays) representing the preselected gear ratio values stored in memory circuit 316.

Figure 7A:
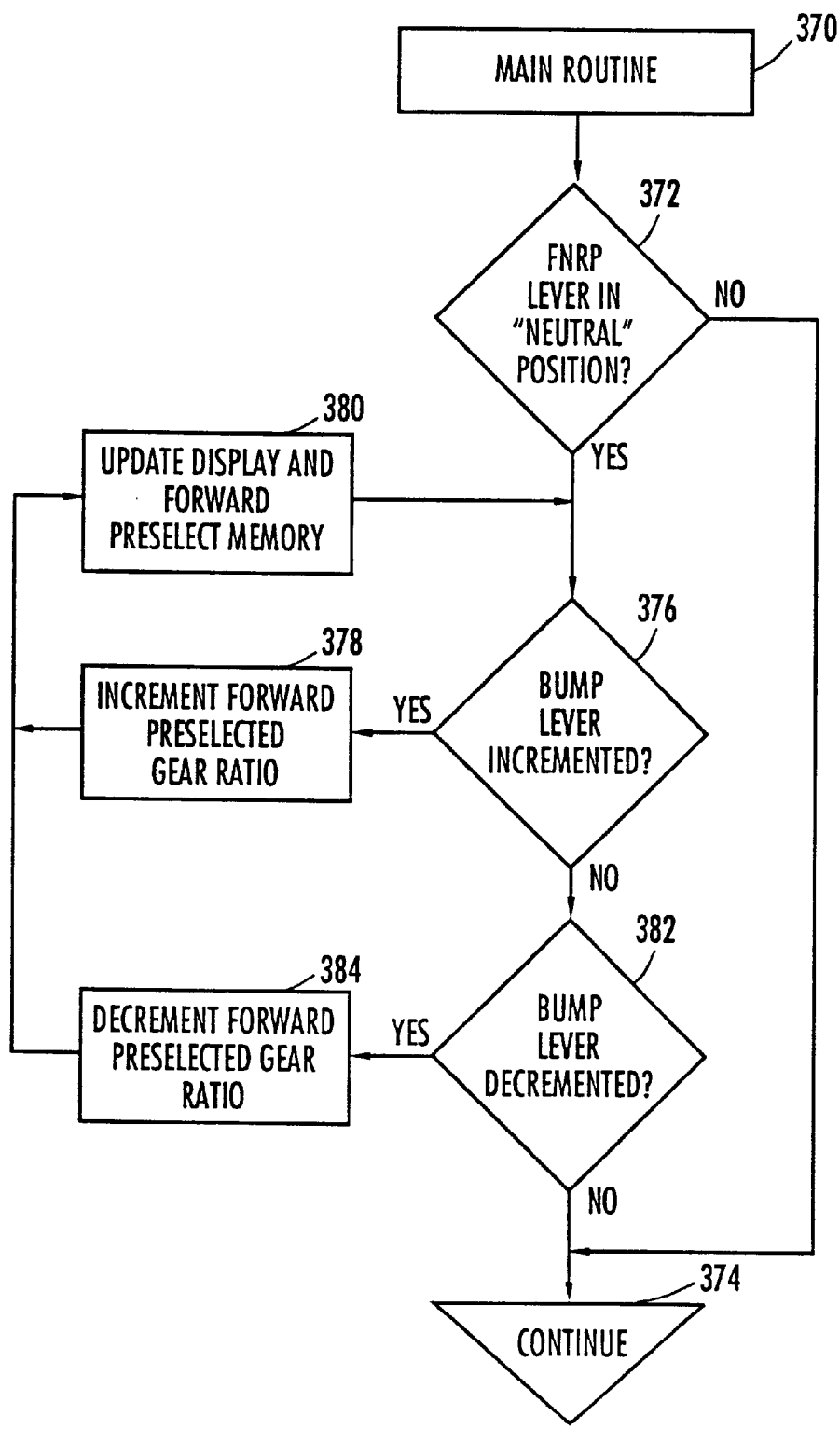
FIGS. 7A and 7B are flow charts depicting the exemplary steps in control logic implemented by the control system of FIGS. 4 and 6 in preselecting forward and reverse gear ratios.
Figure 7B:
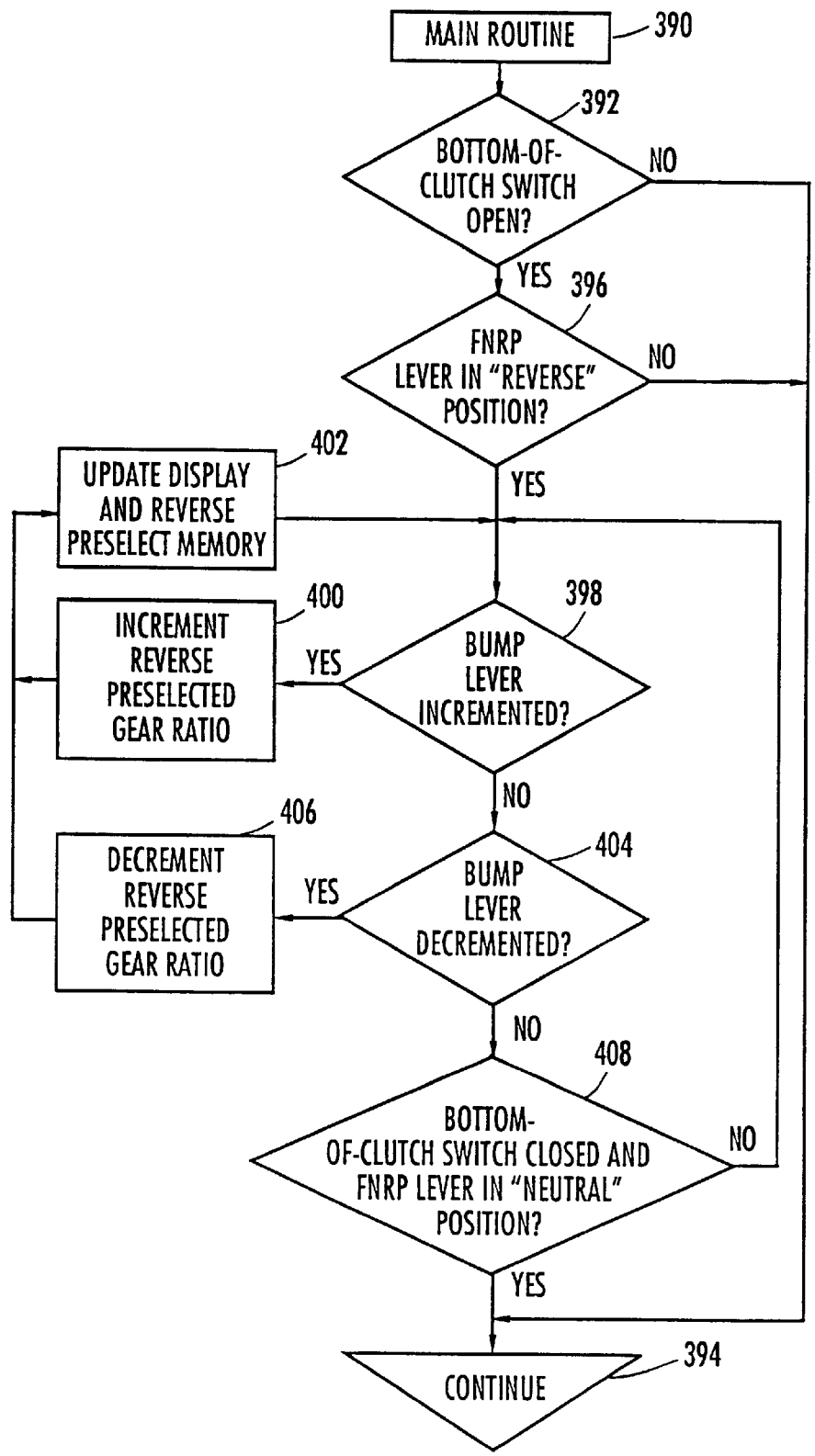

FIGS. 7A and 7B illustrate exemplary steps in control logic for preselecting forward and reverse gear ratio values, respectively, in accordance with the present control system. The preselection routines described below generally permit the vehicle operator to configure controller 42 with transmission 14 in a neutral condition. The values selected and stored during the routine are displayed on display 92 and stored in memory circuit 316. These preselected values are then used as target or command gear ratios to which the transmission is shifted by manipulation of FNRP lever 72. When transmission 14 is engaged in a forward or reverse gear ratio, the operator may alter the commanded gear ratio by moving bump lever 74 to its "increment" or "decrement" position as described above. Such "on the fly" changes cause signal processing circuit 314 to replace the forward and reverse preselected gear ratios with the new command values, and to display the new command values on gear display 92. Thus, the vehicle operator may alter the preselected or command gear ratios in both the forward and reverse directions and keep abreast of the current, stored forward and reverse gear ratio values via display 92.

As represented by block 370, controller 42 cycles through the main transmission control routine stored in memory circuit 316, in which signal processing circuit 314 acts upon input signals for shifting transmission 14 into desired gear ratios as described above. In particular, controller 42 cyclically checks the status of the various inputs and enters subroutines or similar logical processes based upon these inputs. As illustrated at step 372, as part of this main control routine, signal processing circuit 314 cyclically monitors the status of FNRP lever 72. If FNRP lever 72 is not moved to its "neutral" position, signal processing circuit 314 advances to step 374, continuing with the main transmission control routine. However, if at step 372 signal processing circuit 314 determines that FNRP lever 72 is in its "neutral" position, circuit 314 advances to step 376 and, eventually to step 382 wherein the forward preselected gear ratio may be reset. It should be noted that memory circuit 316 preferably stores default forward and reverse gear ratios that serve as the preselected ratios upon power up of vehicle 10, and continue as the preselected ratios until reset as described below. In the presently preferred embodiment, these default preselected gear ratios are the 6th forward gear ratio and the 3rd reverse gear ratio.

At step 376, circuit 314 monitors the state of bump lever 74 to determine if it is moved to its "increment" position. If bump lever 74 is moved to its "increment" position, forward preselect circuit 358 increments the forward preselected gear ratio by adding one to the current forward ratio value stored in memory circuit 316, as indicated at step 378, and proceeds to step 380 where the incremented value is displayed on display 92 and the reset value of the forward preselected gear ratio is stored in memory circuit 316. From step 380, signal processing circuit returns to step 376 and, if bump lever 74 is maintained in its "increment" position, continues to increment the forward preselected gear ratio and update display 92 by cycling through steps 378 and 380. Such incrementing may be continue until the highest forward gear ratio is reached.

When either the highest forward gear ratio is reached or bump lever 74 is moved out of its "increment" position, signal processing circuit 314 advances to step 382, where the state of bump lever 74 is monitored to determine if it is moved to its "decrement" position. If lever 74 is moved to its "decrement" position, forward preselect circuit decrements the forward preselected gear ratio by subtracting one from the current forward ratio value in memory circuit 316, as indicated at step 384. At step 380, display circuit 92 is updated to indicate this change and the reset forward preselected gear ratio value is stored in memory circuit 316. As described above for the incrementing procedure, decrementing of the forward preselected gear ratio may continue for as long as bump lever 74 is held in its "decrement" position, or until the lowest forward gear ratio is reached.

As long as signal processing circuit 314 determines that bump lever 74 is not moved to its "increment" or "decrement" positions at steps 376 and 382 the value of the forward preselected gear ratio stored in memory circuit 314 remains unchanged, and signal processing circuit 314 advances through steps 376 and 382 to step 374. Using the forward preselected gear ratio value stored in memory circuit 314, controller 42 schedules and executes shifting of transmission 14 to the preselected forward gear ratio when FNRP lever 72 is moved from its "neutral" position to its "forward" position, utilizing modulating and skip shifting techniques of the type well known in the art, particularly for higher gear ratios.

As illustrated in FIG. 7B, reverse gear ratio preselection proceeds as follows. As described above, signal processing circuit 314 cycles through a main transmission control routine as indicated at step 390. As part of this routine, signal processing circuit 314 monitors the state of bottom-of-clutch switch 90, as indicated at step 392. So long as switch 90 remains closed, indicating that clutch pedal 84 is not depressed, signal processing circuit 314 advances to step 394 and continues with the main control routine. If, however, switch 90 is found to be open at step 392, signal processing circuit 314 advances to step 396 where the state of FNRP lever 72 is monitored. If, at step 396, FNRP lever 72 is found to be in its "reverse" position, reverse preselect circuit 360 is invoked and advances to the reverse preselection routine described below. If, conversely, at step 396 lever 72 is found not to be in its "reverse" position, signal processing circuit 314 again advances to step 394 and carries on with the main control routine.

Once signal processing circuit 314 has determined that bottom-of-clutch switch 90 is open and FNRP lever 72 is in its "reverse" position, reverse preselect circuit 360 monitors the state of bump lever 74, as indicated at steps 398 and 404. If, at step 398, bump lever 74 is found to be in its "increment" position, signal processing circuit increments the reverse preselect gear ratio by adding one to the reverse gear ratio stored in memory circuit 316, as indicated at step 400. At step 402, display 92 is updated to show this new value for the reverse preselected gear ratio, and the new value is stored in memory circuit 316. This incrementing procedure continues by cycling through steps 398, 400 and 402 so long as bump lever 74 is held in its "increment" position, or until the largest reverse gear ratio is reached.

When either of these events occurs, signal processing circuit 314 advances to step 404 where the state of bump lever 74 is monitored to determine if it has been moved to its "decrement" position. If bump lever 74 is moved to its decrement position, circuit 314 advances to step 406 where the reverse preselected gear ratio value stored in memory circuit 316 is decremented. Display 92 is then updated to reflect this decremented value and the new value is stored in memory circuit 316, as indicated at step 402. Such decrementing may continue so long as bump lever 74 is held in its "decrement" position, or until the lowest reverse gear ratio is reached.

As indicated at step 408, signal processing circuit 314 exits the reverse gear ratio preselection routine at step 408, when bottom-of-clutch switch 90 is found to be closed, indicating that the operator has released clutch pedal 84, and FNRP lever 72 is moved to its "neutral" position. So long as bottom-of-clutch switch 90 is open and FNRP lever 72 is in its "reverse" position, signal processing circuit 314 will respond to movement of bump lever 74 as a command to increment or decrement the reverse preselected gear ratio. Upon exiting the reverse preselection routine at step 408, controller 42 continues the main control routine, as indicated at step 394, and will schedule shifts to the reverse preselected gear ratio stored in memory circuit 316 whenever FNRP lever 72 is moved to its "reverse" position.

As noted above, the forward and reverse preselected gear ratios set by the foregoing procedures continue to be displayed on display 92 throughout normal operation of vehicle 10, unless altered by actuation of bump lever 74. The vehicle operator is thus provided with an indication of both the forward and reverse gear ratios to which transmission 14 will be shifted when FNRP lever 72 is moved from its "neutral" position to either its "forward" or "reverse" position, or when FNRP lever 72 is moved from its "forward" position to its "reverse" position, or vice versa, such as for shuttle shifting between forward and reverse gear ratios in a manner generally known in the art. Once engaged in a forward or reverse gear ratio, however, the operator may use bump lever 74 to upshift or downshift transmission 14, and signal processing circuit 314 then updates the corresponding forward or reverse gear ratio value stored in memory circuit 316 as well as display 92 to reflect the change. It should also be noted that the foregoing procedures permit the vehicle operator to preselect forward and reverse gear ratios completely independently of one another, and to reset the preselected gear ratios in either direction without affecting the preselected ratio in the opposite direction.

Figure 8A:
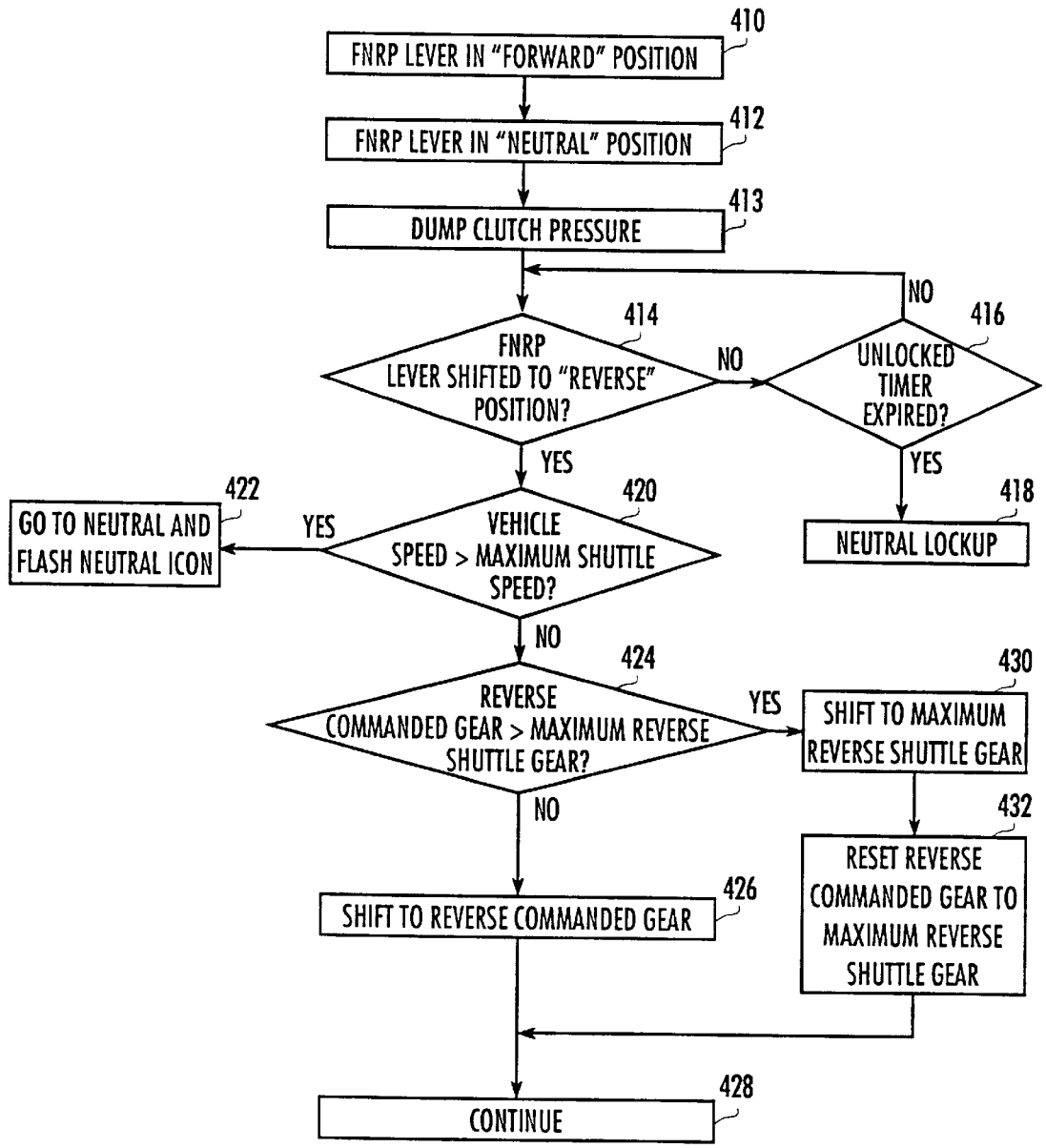
FIGS. 8A, 8B and 8C are flow charts depicting exemplary steps in control logic implemented by the control system for shuttle shifting the transmission between forward and reverse gear ratios.
Figure 8B:
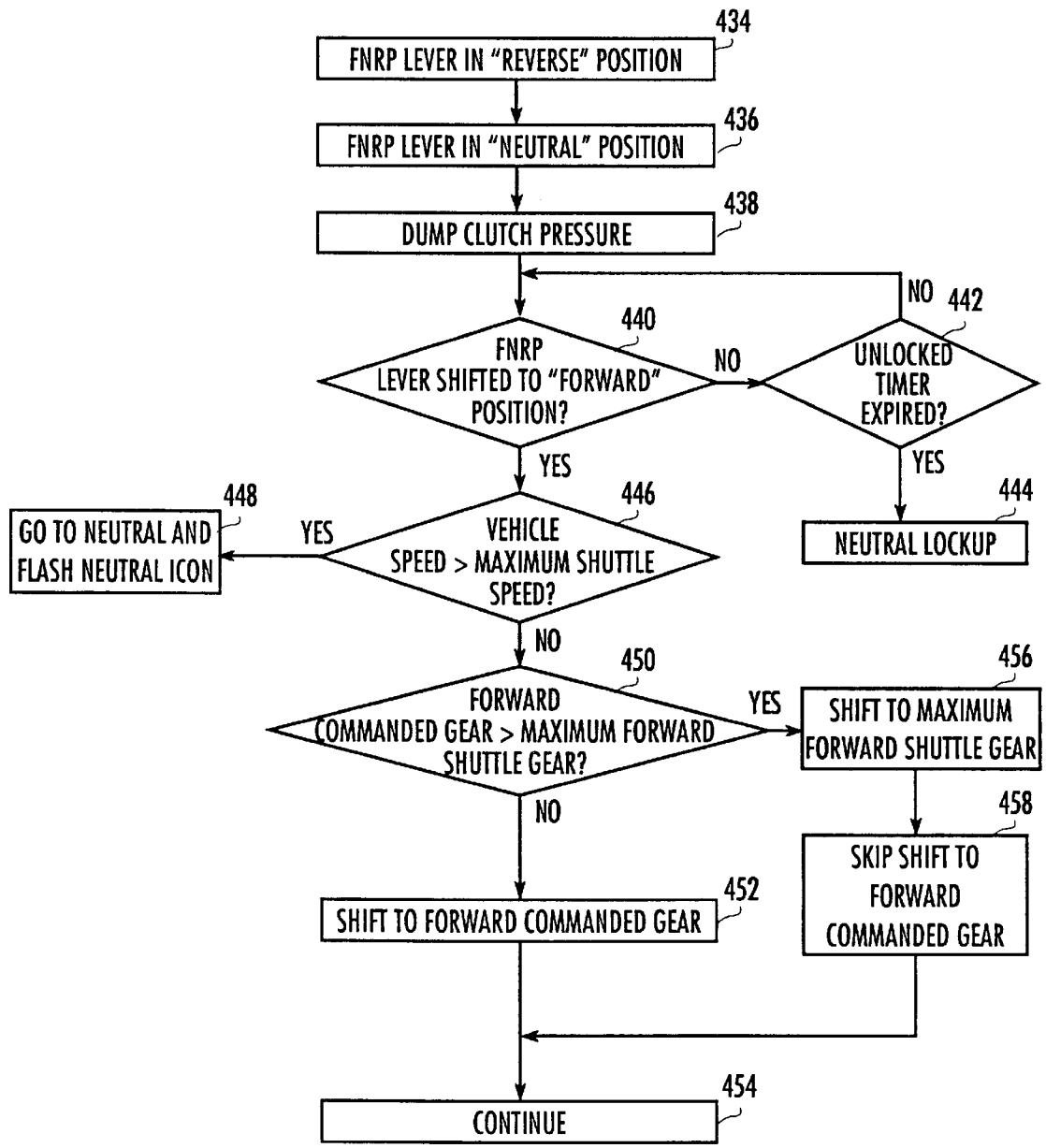
Figure 8C:
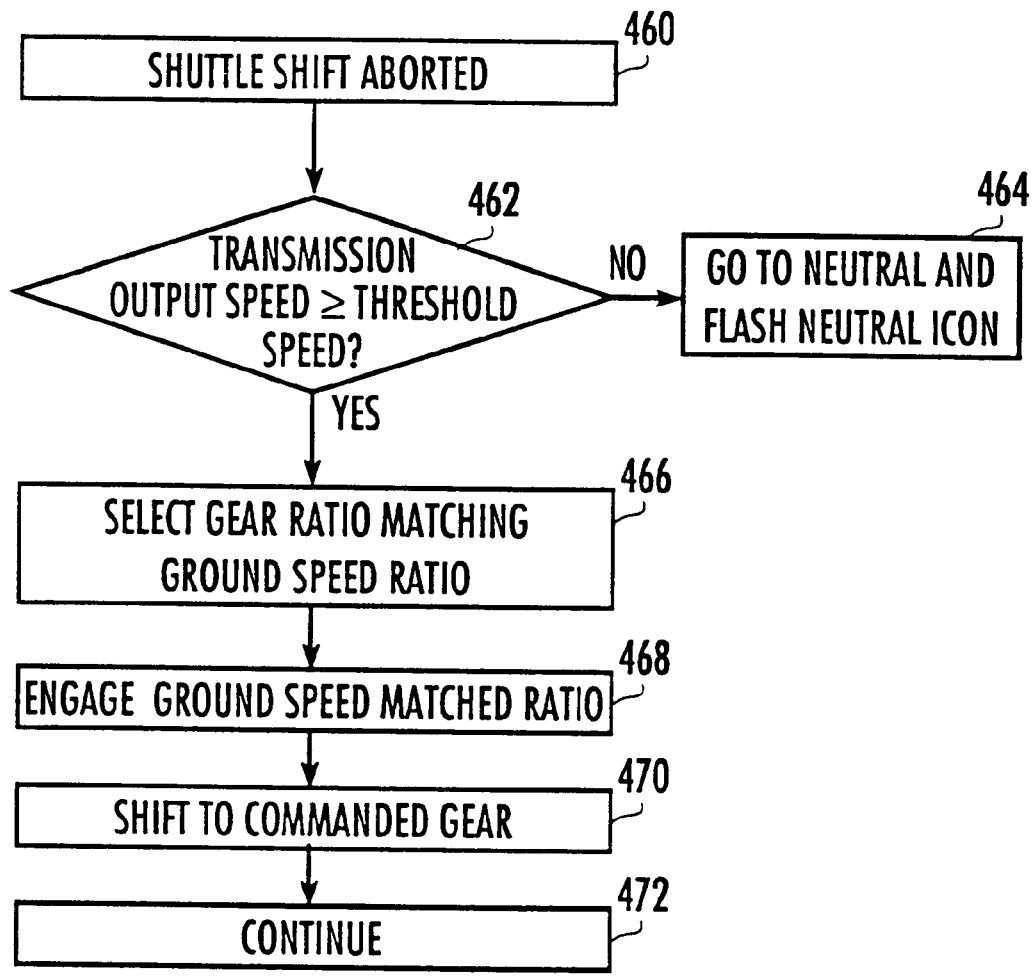

In accordance with the present invention, controller 42 is configured to implement control logic for shuttle shifting transmission 14 as illustrated in FIGS. 8A, 8B and 8C. In particular, FIGS. 8A and 8B illustrate exemplary steps in control logic for shuttle shifting transmission 14 from forward to reverse and from reverse to forward gear ratios, respectively. FIG. 8C illustrates steps in control logic for re-engaging a transmission gear ratio in the event of an aborted shuttle shift. Although such control logic may be implemented in various forms and codes, in the presently preferred embodiment controller 42 cyclically monitors the status of the various input devices and sensors and executes transitions between controlled states of the transmission based upon changes in the inputs from these devices and sensors.

Referring to FIG. 8A, as indicated at block 410, prior to a forward-to-reverse shuttle shift FNRP lever 72 is positioned in its "forward" position. At step 412, FNRP lever 72 is moved from its "forward" position to the "neutral" position as it is being advanced to the "reverse" position for a forward-to-reverse shuttle shift request. At step 413, clutch pressure is dumped from all clutches by de-energizing their corresponding solenoid coils, thus placing transmission 14 in a neutral condition. In the present embodiment, controller 42 places the transmission in neutral for 0.1 seconds to ensure that master clutch 182 is fully released before modulating back into engagement following the shift sequence described below. Controller 42 thereafter monitors the status of reverse switch 243 to determine whether FNRP lever 72 has been moved to the "reverse" position, thereby requesting the shuttle shift. During this time, controller 42 starts a "transmission unlocked" timer and, if at step 414 reverse switch 243 is found not to be closed, checks whether the unlocked timer has expired, as indicated at step 416. In the presently preferred embodiment, the unlocked timer expires after 2 seconds, effectively allowing the vehicle operator 2 seconds to advance lever 72 to its "reverse" position (or to return lever 72 to its "forward" position to abort the shuttle shift as described below). As long as the timer has not expired, controller 42 loops from step 416 back to step 414. If the timer expires before FNRP lever enters the "reverse" position, controller 42 advances from step 416 to step 418 wherein clutches 172 and 174 are engaged by energization of solenoid coils 274 and 276 to stop rotation of intermediate shaft 162. If FNRP lever 72 is moved to its "reverse" position before expiration of the timer, controller 42 advances to step 420.

At step 420 controller 42 compares a sensed parameter representative of vehicle speed to a maximum shuttle shift speed. In the presently preferred embodiment, the sensed parameter employed at step 420 is the actual ground speed of the vehicle as sensed by ground speed sensor 52. For forward-to-reverse shuttle shifts, the maximum allowable shuttle shift speed is 3.7 mph, although other suitable values may be used. If the current vehicle speed exceeds the maximum allowable shuttle shift speed, controller 42 advances to step 422, where transmission 14 is placed in a neutral condition and neutral icon 342 of display 92 is flashed to inform the operator that the vehicle speed is too great to permit a shuttle shift. The operator may then return FNRP lever 72 to the "neutral" position to effectuate another shift request. Doing so discontinues flashing of the neutral icon.

If the vehicle speed does not exceed the maximum allowable shuttle shift speed at step 420, controller 42 advances to step 424 where the reverse commanded gear ratio, i.e. the preselected reverse gear ratio stored in memory circuit 316 and displayed on digital display 348, with a value, also stored in memory circuit 316, representative of a maximum allowable reverse shuttle shift gear ratio. For the purposes of shuttle shifting, the preselected gear ratio is considered a target gear ratio and the maximum allowable shuttle shift gear ratio is considered a threshold ratio. In the presently preferred embodiment, the maximum allowable reverse shuttle shift gear ratio is the third reverse gear ratio. If the commanded or target gear ratio does not exceed the maximum allowable ratio, controller 42 advances to step 426, where a shift is scheduled and executed to the commanded gear ratio by modulated engagement of master clutch 182. If, however, the commanded gear ratio exceeds the maximum allowable ratio, controller 42 advances to step 430, where a shift is scheduled and executed to the maximum reverse shuttle shift gear ratio, also by modulated engagement of clutch 182. At step 432, the reverse commanded gear ratio is reset equal to the maximum allowable reverse shuttle shift gear ratio. This ratio is then stored in memory circuit 316 as summarized above and the reset value is displayed on display 348. From steps 426 or 432, controller 42 moves to step 428, where the overall transmission control routine continues to cyclically run.

FIG. 8B illustrates exemplary steps in control logic for reverse-to-forward shuttle shifts. Such shifts begin with FNRP lever 72 in the "reverse" position, as indicated at step 434. At step 436, FNRP lever 72 is moved to its "neutral" position and at step 438 clutch pressure is dumped as discussed above with respect to step 413 to ensure that master clutch 182 is fully disengaged before beginning re-engagement. At step 440, controller 42 begins the unlocked timer discussed above and monitors the status of forward switch 244. If forward switch 244 has not been closed, indicating that the vehicle operator has not completed movement of FNRP lever 72 from the "reverse" to the "forward" position, controller 42 checks whether the unlocked timer has expired, as indicated at step 442. Again, the unlocked timer allows the operator 2 seconds for placing FNRP lever 72 in the "forward" position to request the shuttle shift (or back to the "reverse" position to abort the shuttle shift as described below). If 2 seconds elapses before forward switch 244 is closed, at step 444 intermediate shaft 162 of transmission 14 is stopped by engagement of clutches 172 and 174. If, on the other hand, FNRP lever 72 is moved to the "forward" position prior to expiration of the timer, controller 42 advances to step 446.

At step 446, controller 42 compares a parameter representative of vehicle speed, such as the true ground speed signal from sensor 52, to a maximum allowable shuttle speed value. In the presently preferred embodiment, the maximum allowable shuttle speed for reverse-to-forward shuttle shifts is 3.7 mph. If the vehicle speed exceeds the maximum allowable shuttle shift speed, controller 42 places transmission 14 in neutral, as indicated at step 448, and flashes neutral icon 342. The vehicle operator can then request another shift by returning FNRP lever 72 to its "neutral" position.

If at step 446 the vehicle speed is found not to exceed the maximum allowable shuttle shift speed, controller 42 compares the forward commanded gear ratio, i.e. the preselected gear ratio stored in memory circuit 316 and displayed on digital display 346, to a maximum allowable forward shuttle shift gear ratio. For the purposes of shuttle shifting, the commanded or preselected gear ratio is considered the reverse-to-forward shuttle shifting target gear ratio. In the presently preferred embodiment, the maximum allowable forward shuttle shifting gear ratio is the 6th forward gear ratio. If the commanded or target gear ratio does not exceed the maximum allowable forward shuttle shifting gear ratio, controller 42 advances to step 452, where it schedules and executes a shift to the commanded forward gear, modulating engagement of master clutch 182. If, however the forward commanded gear ratio is greater than the maximum allowable forward shuttle shifting gear ratio, controller 42 branches to step 456 where a shift is schedules and executed to the maximum forward shuttle shifting gear ratio. Thereafter, controller 42 continues upshifting transmission 14 toward the target or commanded gear ratio. Controller 42 may use a skip shifting technique for such upshifting, skipping intermediate gear ratios so long as the gear ratios engaged do not cause the engine speed to drop below 700 rpm. The reverse-to-forward shuttle shifting routine ends with eventual engagement of the target or commanded gear ratio, after which controller 42 continues with the main transmission control routine as indicated at step 454.

FIG. 8C illustrates exemplary steps in control logic executed by controller 42 in the event of an aborted shuttle shift. In the broadest sense, an aborted shuttle shift occurs when FNRP lever 72 is moved from one of its directional positions, i.e. "forward" or "reverse" and back to the same position prior to completion of a shuttle shift. In the presently preferred embodiment, the logic illustrated in FIG. 8A is executed when FNRP lever 72 is moved from one of its directional positions and back to the same position without reaching its "neutral" position. Such movement detected by controller 42 is considered an aborted shuttle shift, as indicated at step 460. Following detection of such an aborted shuttle shift, controller 42 compares the transmission output speed, as detected by sensor 46, with a threshold speed at block 462. The threshold speed used in step 462 is a very low speed, such as the minimum detectable speed of sensor 46 (e.g. 8.2 rpm). When controller 42 determines that the transmission output speed is below this threshold speed, it is possible that a travel direction reversal has taken place and controller 42 proceeds to step 464 where transmission 14 is placed in a neutral condition by releasing all clutches and neutral icon 342 begins to flash. The operator may then request another shift by first moving FNRP lever 72 back to the "neutral" position.

If, at step 462, the transmission output speed is found to be greater than or equal to the threshold speed, controller 42 proceeds to step 466 where a gear ratio most closely matching a ratio between the engine output speed and the vehicle ground speed is selected. In the presently preferred embodiment, the ground speed used to generate the ground speed matched ratio is sensed by true ground speed sensor 52, although the sensed speed of a non-driven axle could also be used. The engine output speed is detected by sensor 44. The use of this ground speed matched control routine permits transmission 14 to be re-engaged at a gear ratio that will result in as little engine drag or acceleration and as little vehicle jerk as possible. Following identification of the engine speed to ground speed ratio, controller 42 selects the transmission gear ratio most closely matching this ratio and executes a shift to the selected ratio at step 468. Following engagement of the ground speed matched ratio, controller 42 continues to shift transmission 14 toward the commanded gear ratio. Once the commanded gear ratio is reached, controller 42 returns to the main control routine, as indicated at step 472.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

I claim:

1. A control system for a power transmission in a work vehicle, the transmission being of the type including a plurality of intermeshing gears and a plurality of clutches associated with the gears, the clutches being engageable and disengageable in predetermined combinations in response to control signals for establishing predetermined forward and reverse gear ratios between and input shaft and an output shaft of the transmission, the control system including:

a sensor for detecting a parameter representative of vehicle speed;

a memory circuit for storing values representative of predetermined forward and reverse gear ratios, and of a reference vehicle speed;

an operator movable command device including a forward position for commanding the transmission to engage a forward gear ratio and a reverse position for commanding the transmission to engage a reverse gear ratio; and a control circuit coupled to the sensor, the memory circuit and the command device, the control circuit being configured to monitor movement of the command device and to generate control signals for shifting the transmission to a neutral condition or between the predetermined forward and reverse gear ratios in response to movement of the command device between its forward and reverse positions based upon a predetermined relationship between the vehicle speed and the reference vehicle speed.

2. The control system of claim 1, wherein the transmission is shifted to a neutral condition when the command device is moved between its forward and reverse positions and the vehicle speed exceeds the reference vehicle speed.

3. The control system of claim 1, wherein the control circuit is configured to selectively shift the transmission to the neutral condition or between the predetermined forward and reverse gear ratios based upon a first reference vehicle speed when the command device is moved from its forward position to its reverse position and upon a second vehicle speed when the command device is moved from its reverse position to its forward position.

4. A control system for a power transmission in a work vehicle, the transmission being of the type including a plurality of intermeshing gears and a plurality of clutches associated with the gears, the clutches being engageable and disengageable in predetermined combinations in response to control signals for establishing predetermined forward and reverse gear ratios between and input shaft and an output shaft of the transmission, the control system including:

a memory circuit for storing values representative of predetermined forward and reverse gear ratios and of a predetermined threshold gear ratio;

an operator movable command device including a forward position for commanding the transmission to engage the predetermined forward gear ratio and a reverse position for commanding the transmission to engage the predetermined reverse gear ratio; and a control circuit coupled to the memory circuit and to the command device, the control circuit being configured to monitor movement of the command device between the forward and reverse positions and to generate control signals for shuttle shifting the transmission upon movement of the command device between the forward and reverse positions, the control circuit controlling shifting of the transmission in a first manner or a second manner based upon a predetermined relationship between the predetermined gear ratio to which the transmission is to be shifted and the threshold gear ratio.

5. The control system of claim 4, wherein the manner of shifting the transmission is based on a first threshold gear ratio for forward-to-reverse shuttle shifts and on a second threshold gear ratio for reverse-to-forward shuttle shifts.

6. The control system of claim 4, wherein for forward-to-reverse shuttle shifts, the predetermined reverse gear ratio is engaged when the predetermined reverse gear ratio does not exceed the threshold gear ratio, and the threshold gear ratio is engaged when the predetermined reverse gear ratio exceeds the threshold gear ratio.

7. The control system of claim 6, wherein when the predetermined reverse gear ratio exceeds the threshold ratio, the predetermined reverse gear ratio is set equal to the threshold gear ratio.

8. The control system of claim 4, wherein for reverse-to-forward shuttle shifts, the predetermined forward gear ratio is engaged when the predetermined forward gear ratio does not exceed the threshold gear ratio, and the threshold gear ratio is engaged when the predetermined forward gear ratio exceeds the threshold gear ratio.

9. The control system of claim 8, wherein following engagement of the threshold gear ratio, the control circuit is configured to shift the transmission from the threshold gear ratio to the predetermined gear ratio.

10. A control system for a power transmission in a work vehicle, the transmission being of the type including a plurality of intermeshing gears and a plurality of clutches associated with the gears, the clutches being engageable and disengageable in predetermined combinations in response to control signals for establishing predetermined forward and reverse gear ratios between and input shaft and an output shaft of the transmission, the control system including:

a first sensor for detecting a first parameter representative of ground speed of the vehicle;

a second sensor for detecting a second parameter representative of engine output speed;

an operator movable command device including a forward position for commanding the transmission to engage the predetermined forward gear ratio and a reverse position for commanding the transmission to engage the predetermined reverse gear ratio; and a control circuit coupled to the sensors and the command device, the control circuit being configured to monitor movement of the command device between the forward and reverse positions and to generate control signals for shuttle shifting the transmission between forward and reverse gear ratios in response to movement of the command device between the forward and reverse positions, and to execute a ground speed matching control routine to engage a gear ratio most closely matching a ratio between the first and second parameters when the command device is moved from the forward or the reverse position and back to the same position prior to completion of a shuttle shift.

11. The control system of claim 10, further including a memory circuit for storing values representative of predetermined forward and reverse gear ratios, wherein the control circuit is configured to shuttle shift the transmission between the predetermined gear ratios when the command device is moved between the forward and reverse positions.

12. The control system of claim 11, wherein following a shift to a ground speed matched gear ratio, the control circuit is further configured to shift the transmission to the predetermined gear ratio in its then current direction of travel.

13. A control system for a power transmission in a work vehicle, the transmission being of the type including a plurality of intermeshing gears and a plurality of clutches associated with the gears, the clutches being engageable and disengageable in predetermined combinations in response to control signals for establishing predetermined forward and reverse gear ratios between and input shaft and an output shaft of the transmission, the control system including:

a memory circuit for storing values representative of predetermined forward and reverse gear ratios and of a predetermined threshold gear ratio;

an operator movable command device including first and second positions for commanding the transmission to engage the predetermined gear ratios; and a control circuit coupled to the memory circuit and to the command device, the control circuit being configured to monitor movement of the command device between the first and second positions and to generate control signals for shuttle shifting the transmission upon movement of the command device between the first and second positions and for placing the transmission in a neutral condition when the command device is moved from the first position without entering the second position within a predetermined period of time.

14. The control system of claim 13, wherein after the predetermined period of time the control circuit is configured to command engagement of clutches for stopping rotation of an intermediate shaft of the transmission.

15. A method for shuttle shifting a power transmission between predetermined forward and reverse gear ratios, comprising the steps of:

a) comparing a target gear ratio to be engaged following a shuttle shift to a threshold gear ratio;

b) executing the shuttle shift in a first manner when the target gear ratio and the threshold gear ratio satisfy a predetermined relationship and executing the shuttle shift in a second manner when the target gear and the threshold gear do not satisfy the predetermined relationship.

16. The method of claim 15, wherein the shuttle shift is a forward-to-reverse shuttle shift.

17. The method of claim 16, wherein the first manner includes shifting the transmission to the target gear ratio when the target gear ratio does not exceed the threshold gear ratio and the second manner includes shifting the transmission to the threshold gear ratio when the target gear ratio exceeds the threshold gear ratio.

18. The method of claim 15, wherein the shuttle shift is a reverse-to-forward shuttle shift.

19. The method of claim 18, wherein the first manner includes shifting the transmission to the target gear ratio when the target gear ratio does not exceed the threshold gear ratio and the second manner includes shifting the transmission to the threshold gear ratio when the target gear ratio exceeds the threshold gear ratio.

20. The method of claim 19, wherein when the target gear ratio exceeds the threshold gear ratio, the transmission is shifted to the target gear ratio following engagement of the threshold gear ratio.

21. A method for shifting a power shift transmission, comprising the steps of:

a) monitoring movement of an operator movable shift command device from a first directional position;

b) shuttle shifting the transmission between predetermined forward and reverse gear ratios when the command device is moved from the first directional position to a second directional position opposite to the first directional position;

c) executing a ground speed matching control routine when the command device is moved back to the first directional position prior to completion of the shuttle shift, the ground speed matching control routine; and d) engaging a ground speed matched gear ratio.

22. The method of claim 21, wherein the ground speed matching control routine executed at step c) includes determining a ground speed ratio between engine speed and a parameter proportional to vehicle speed and selecting a transmission gear ratio most closely matching the ground speed ratio.

23. The method of claim 21, wherein the ground speed matching control routine is executed when the command device is moved out of the first directional position and back to the first directional position without entering into a neutral position.

* * * * *